(12) United States Patent
Kazama et al.

(10) Patent No.: US 7,979,879 B2
(45) Date of Patent: Jul. 12, 2011

(54) VIDEO CONTENTS DISPLAY SYSTEM, VIDEO CONTENTS DISPLAY METHOD, AND PROGRAM FOR THE SAME

(75) Inventors: Hisashi Kazama, Yokohama (JP); Takahisa Yoneyama, Yokohama (JP); Hiroto Yoshihara, Ichikawa (JP); Satoshi Uchida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 11/526,298

(22) Filed: Sep. 25, 2006

(65) Prior Publication Data

US 2007/0107015 A1 May 10, 2007

(30) Foreign Application Priority Data

Sep. 26, 2005 (JP) .................................. 2005-278738

(51) Int. Cl.
*H04N 5/445* (2011.01)
*G06F 17/00* (2006.01)
*G06T 1/00* (2006.01)
*G09G 5/00* (2006.01)

(52) U.S. Cl. ................ 725/41; 725/37; 725/39; 725/43; 345/418; 345/594

(58) Field of Classification Search ........................ None
See application file for complete search history.

(56) References Cited

U.S. PATENT DOCUMENTS

| | | | | |
|---|---|---|---|---|
| 5,963,203 A | * | 10/1999 | Goldberg et al. | 715/723 |
| 6,012,072 A | | 1/2000 | Lucas et al. | |
| 6,253,218 B1 | * | 6/2001 | Aoki et al. | 715/201 |
| 6,281,898 B1 | * | 8/2001 | Nikolovska et al. | 715/848 |
| 6,331,852 B1 | | 12/2001 | Gould et al. | |
| 6,583,793 B1 | | 6/2003 | Gould et al. | |
| 6,621,509 B1 | | 9/2003 | Eiref et al. | |
| 2002/0056095 A1 | * | 5/2002 | Uehara et al. | 725/38 |
| 2004/0194136 A1 | * | 9/2004 | Finseth et al. | 725/39 |
| 2005/0097603 A1 | * | 5/2005 | Kikinis | 725/44 |
| 2006/0064716 A1 | * | 3/2006 | Sull et al. | 725/37 |
| 2008/0082927 A1 | * | 4/2008 | Kelts | 715/762 |

FOREIGN PATENT DOCUMENTS

| | | | | |
|---|---|---|---|---|
| JP | 2001169197 A | * | 6/2001 | |
| JP | 2004-096479 | | 3/2004 | |

* cited by examiner

*Primary Examiner* — James Sheleheda
*Assistant Examiner* — Omar Parra
(74) *Attorney, Agent, or Firm* — Sprinkle IP Law Group

(57) ABSTRACT

A video contents display system has a contents information display section that allows pieces of contents information on a plurality of recorded video contents to be displayed along a time axis on a screen, and a video contents display section that displays the plurality of video contents at a specified time on the time axis as motion pictures or still images.

17 Claims, 19 Drawing Sheets

FIG.4

| PROGRAM ID | CHANNEL NUMBER | BRAODCASTING DATE | TIME ZONE (START TIME TO END TIME) | PROGRAM TITLE | GENRE | ONE KEY FRAME | INFORMATION ON LINK TO EXTENSION TABLE |
|---|---|---|---|---|---|---|---|
| 31a | 31b | 31c | 31d | 31e | 31f | 31g | 31h |
|  |  |  |  |  |  |  |  |
|  |  |  |  |  |  |  |  |
|  |  |  |  |  |  |  |  |
|  |  |  |  |  |  |  |  |

(Table 31)

FIG.6

| PROGRAM ID | RECOGNITION SCHEME | HIGHLIGHT SCENE COUNT |
|---|---|---|
| 000X | BASEBALL CHANCE RECOGNITION SCHEME A | |

FIG.7

| SCENE NUMBER | START TIME | END TIME | CLASSIFICATION | DETERMINATION VALUE SCORE | VIEWING COUNT |
|---|---|---|---|---|---|
| 0001 | 10:00 | 10:10 | SCORING SCENE | | |
| 0002 | 10:40 | 10:47 | SCORING SCENE | | |
| 0003 | 11:00 | 11:10 | DEFENSE SCENE | | |
| | | | ATTACK SCENE | | |

FIG.8

| IMAGE NUMBER | INTRA-CONTENTS TIME | IMAGE INFORMATION(FORM, SIZE, COLOR BIT COUNT) | LINK TO IMAGE DATA |
|---|---|---|---|
| 0001 | | | |
| 0002 | | | |
| 0003 | | | |
| 0004 | | | |

71a → 71b → 71c → 71d →

71 →

THUMBNAIL IMAGES

THUMBNAIL IMAGES

VIDEO CONTENTS DISPLAY SYSTEM, VIDEO CONTENTS DISPLAY METHOD, AND PROGRAM FOR THE SAME

CROSS REFERENCE TO RELATED APPLICATIONS

This application is based upon and claims the benefit of priority from the prior Japanese Patent Application No. 2005-278738 filed on Sep. 26, 2005; the entire contents of which are incorporated herein by reference.

BACKGROUND OF THE INVENTION

1. Field of the Invention

The present invention relates to a video contents display system, a video contents display method, and a program for the same.

2. Description of the Prior Art

In recent years, apparatuses which can record video contents such as TV programs for long hours have prevailed. These recording apparatuses include what is called hard disk recorder (hereinafter referred to as HDD recorders) containing hard disk devices, home servers, and personal computers (hereinafter simply referred to as PCs). The prevalence is due to the increased storage capacities and reasonable prices of information recording devices such as hard disk devices.

With a common HDD recorder, a user uses the functions of an apparatus to select one to be viewed out of a plurality of recorded programs, from a list of program titles and the like. On this occasion, the plurality of programs, selection candidates, are displayed in a list of what is called thumbnails. The user selects a program while viewing the thumbnails.

Practical use has also been made of apparatuses that contain a plurality of tuners to enable recording of a plurality of programs being currently broadcast. These apparatuses also display a plurality of recorded programs as is the case with weekly program guide tables in newspapers and the like.

However, to allow one of a plurality of recorded programs to be selected for viewing, the above conventional apparatuses list only a plurality of program names displayed in one screen or only one thumbnail for each program, in one screen. These lists are thus not easy to see for users. Further, the display of a plurality of recorded programs similar to that in weekly program guide tables is not easy to see either. Moreover, users have difficulty in an operation of retrieving a desired one out of many recorded programs.

SUMMARY OF THE INVENTION

A video contents display system according to an aspect of the present invention has a contents information display section that allows contents information on a plurality of recorded video contents to be displayed along a time axis on a screen and a video contents display section that allows the plurality of video contents to be displayed as motion pictures or still images at a specified time on the time axis.

A video contents display method according to an aspect of the present invention includes displaying contents information on a plurality of recorded video contents along a time axis on a screen and displaying the plurality of video contents as motion pictures or still images at a specified time on the time axis.

A program according to an aspect of the present invention allows computer to execute a function that displays pieces of contents information on a plurality of recorded video contents along a time axis on a screen and a function that displays the plurality of video contents as motion pictures or still images at a specified time on the time axis.

A video contents display system according to an aspect of the present invention has a still image generating section that, upon receiving a predetermined command, generates a predetermined number of still images from information on recorded video contents, along time elapse from a predetermined time, a still image display section that three-dimensionally displays the predetermined number of still images generated, along a predetermined axis on a screen and a still image information sequential-transmission section that, every time the still image generating section generates one of the still images, sequentially transmits information on the still image to the still image display section.

A video contents display method according to an aspect of the present invention includes generating, upon receiving a predetermined command, a predetermined number of still images from information on recorded video contents, along time elapse from a predetermined time, transmitting, every time one of the still images is generated, information on the still image, and three-dimensionally displaying the predetermined number of received still images along a predetermined axis on a screen.

A program according to an aspect of the present invention displays video contents and allows a computer to execute a function that, upon receiving a predetermined command, generates a predetermined number of still images from information on recorded video contents, along time elapse from a predetermined time, a function that, every time the still image generating section generates one of the still images, sequentially transmits information on the still image, and a function that three-dimensionally displays the predetermined number of received still images along a predetermined axis on a screen.

BRIEF DESCRIPTION OF THE DRAWINGS

FIG. 4 is a diagram illustrating the configuration of a basic table according to the embodiment of the present invention;

FIG. 6 is a diagram showing an example of a highlight scene common-information table according to the embodiment of the present invention;

FIG. 7 is a diagram showing an example of a highlight information table according to the embodiment of the present invention;

FIG. 8 is a diagram showing an example of a thumbnail image row information table according to the embodiment of the present invention;

DETAILED DESCRIPTION OF THE PREFERRED EMBODIMENTS

Embodiments of the present invention will be described below with reference to the drawings.

Figure 1:
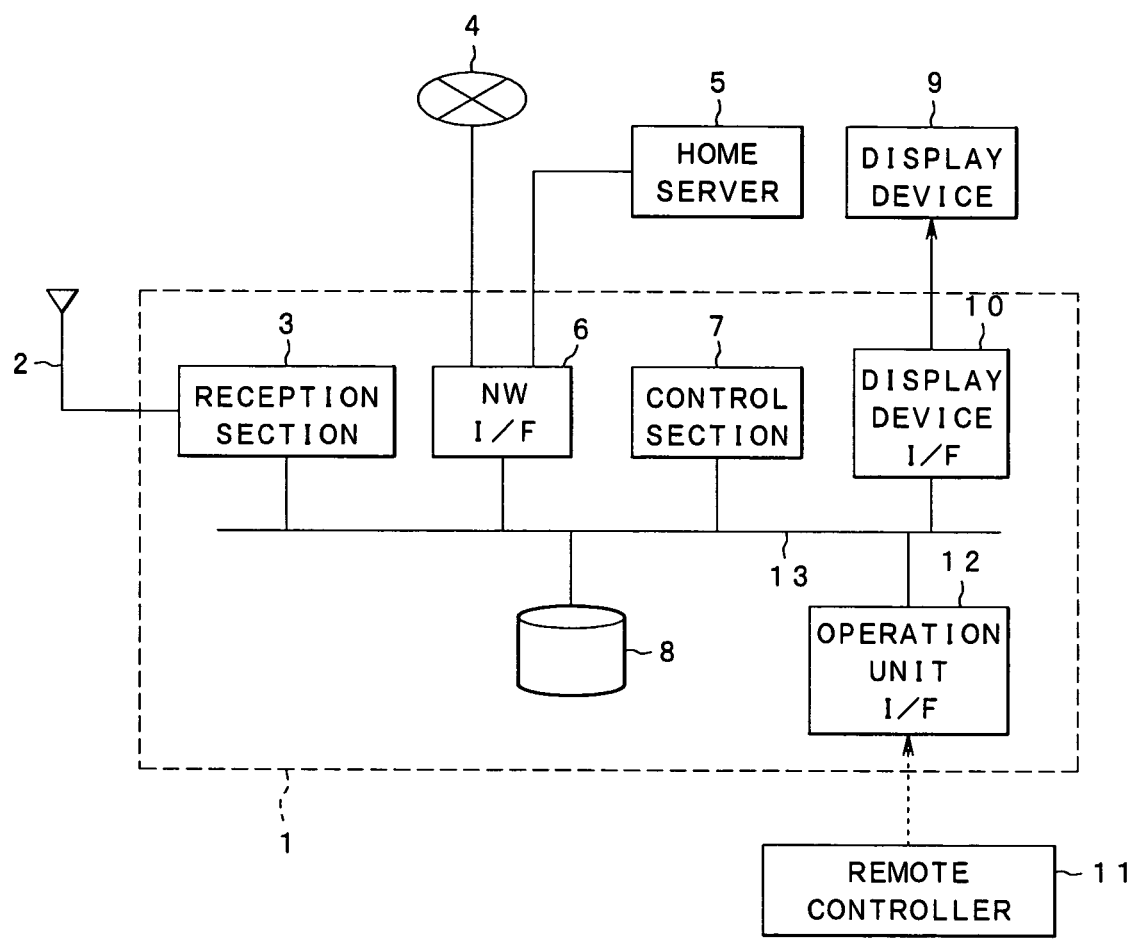
FIG. 1 is a block diagram showing the configuration of a video contents reproducing system according to an embodiment of the present invention.

First, with reference to the drawings, description will be given of the configuration of a video contents recording and reproducing system (hereinafter simply referred to as a video contents reproducing system) according to the present embodiment. FIG. 1 is a block diagram showing the configuration of a video contents reproducing system according to the present embodiment.

A video contents reproducing apparatus 1 that is a video contents display system includes a receiver or a reception section 3 that receives signals from an antenna 2, a network interface section (hereinafter simply referred to as an NWI/F) 6 that connects the Internet 4 to a home server 5, a control section 7 including a central processing unit (CPU), an HDD 8 that is a recording section in which video contents are recorded, a display device interface section (hereinafter simply referred to as a display device I/F) 10 that outputs display signals to a display device 9, an operation unit interface section (hereinafter simply referred to as an operation I/F) 12 that receives operation signals from an operating remote controller 11. The reception section 3, NWI/F 6, control section 7, HDD 8, display device I/F 9, and operation unit I/F 10 are connected together via a bus 13. At the same time, the display device I/F 10 processes sound signals contained in information on video contents and outputs the processed sound signals to a speaker or the like (not shown).

A user operates the remote controller 11 to transmit a predetermined command to the video contents reproducing apparatus 1. This enables information on a plurality of programs received through a plurality of channels via the reception section 3 or NWI/F 6, that is, information on a plurality of video contents (hereinafter simply referred to as contents) to be recorded in the HDD 8. The user then operates the remote controller 11 to transmit a predetermined command to the video contents reproducing apparatus 1. This allows a desired one of the plurality of contents recorded in the HDD 8 to be retrieved and reproduced, and causes the display device 9 to display the reproduced content for viewing.

The reception unit 3 includes a plurality of tuners and can receive, through the antenna 2, information on contents broadcast through a plurality of channels. The NWI/F 6 can receive information on a plurality of distributed contents from the Internet 4 or home server 5.

Various processes in the video contents reproducing apparatus 1 are integrally executed by the control section 7, which includes a CPU, a ROM, and a RAM (not shown). The CPU of the control section 7 executes software programs stored in the ROM and others to achieve functions corresponding to various processes such as recording and reproduction.

The video contents reproducing apparatus 1 also has a recording media drive and reproduction device (not shown) that acquires video information from package media such as a DVD.

In the present embodiment, the CPU is a processor which has, for example, a multicore multiprocessor architecture and which can execute a real-time OS (Operating System). Accordingly, the control section 7 can process a large amount of data, particularly video data at a high speed in parallel.

Specifically, the control section 7 comprises a group of nine processors integrated on one chip and which can execute parallel processes; the processors respectively consist of, for example, a 64-bit CPU core and eight independent signal processing processors SPE (Synergistic Processing Element) handling 128-bit registers. The SPEs are suitable for handling multimedia data and streaming data. Each SPE has an SRAM with a single port that performs pipeline operation, as 256-Kb local memory, in order to execute different signal processes in parallel.

Figure 2:
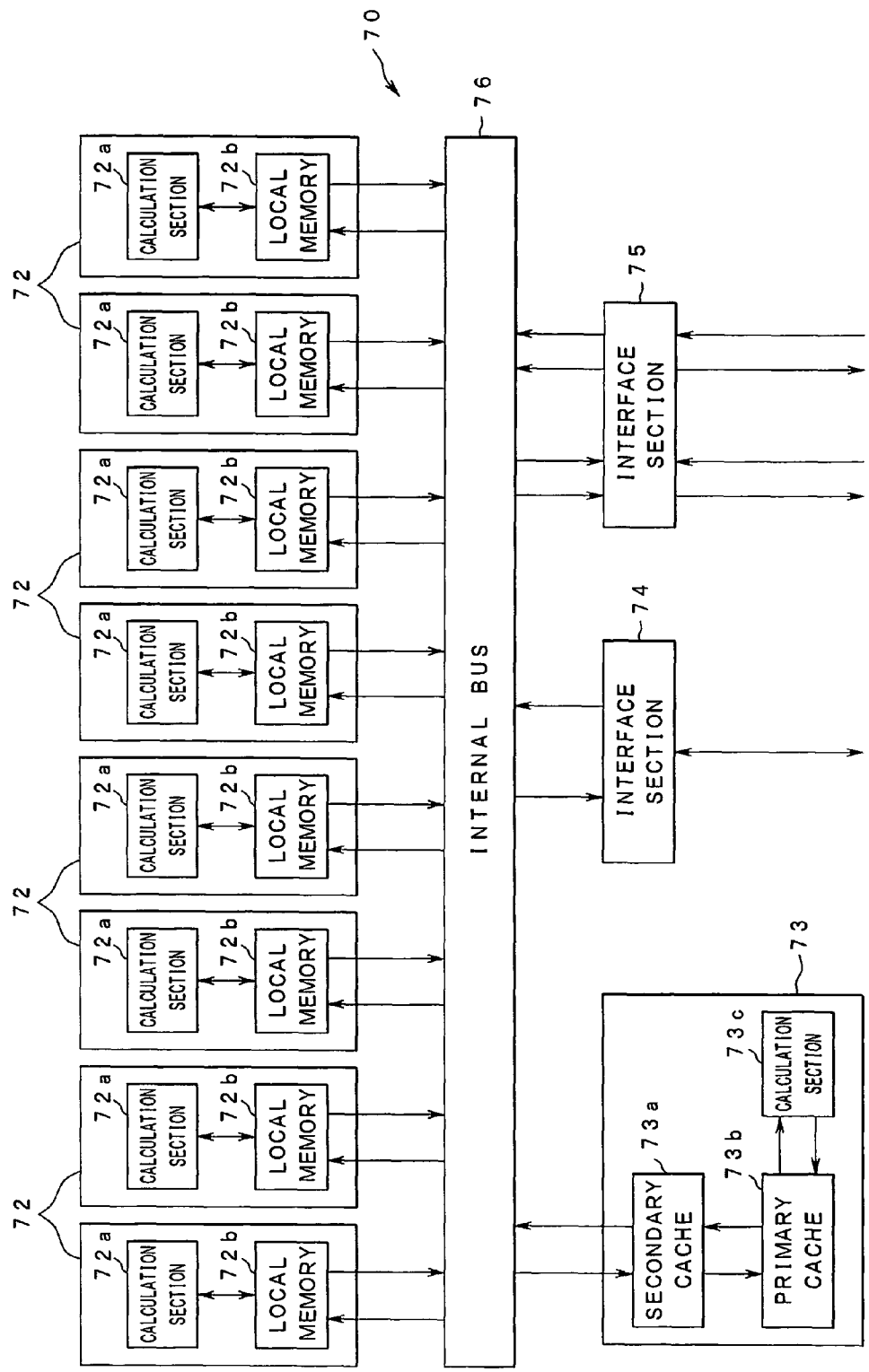
FIG. 2 is a block diagram showing an example of configuration of a processor included in a control section.

FIG. 2 is a block diagram showing an example of configuration of such a processor included in the control section 7. A processor 70 has eight SPEs 72, a core CPU 73 serving as a master processor, and two interface sections 74 and 75, the components 72, 73, 74, and 75 being connected together via an internal bus 76. Each of the SPEs 72 includes a calculation section 72a that is a coprocessor and a local memory 72b connected to the calculation section 72a. A load instruction and a store instruction for the SPE 72 uses a local address space for the local memory 72b provided in the SPE 72 instead of the address space for the entire system. This prevents address spaces for programs executed by the calculation sections 72a from interfering with one another. The local memories 72b are connected to the internal bus 76. A DMA controller (not shown) incorporated into each SPE 72 enables data transfers between the SPE and a main memory to be scheduled on the basis of software, in parallel with execution of an instruction by the calculation section 72a of the SPE 72.

A core CPU 73 includes a secondary cache 73a, a primary cache 73b, and a calculation section 73c. The interface section 74 is a DRAM interface for 2-channel XDR which serves as a memory interface. An interface section 75 is a FlexIO interface serving as a system interface.

The processors of the multicore multiprocessor architecture which can perform parallel processes enable a user interface data generating section and a contents receiving section to smoothly execute parallel processes; the user interface data generating section and contents receiving section will be described later. The CPU may be a combination of a plurality of processors instead of a single processor.

Figure 3:
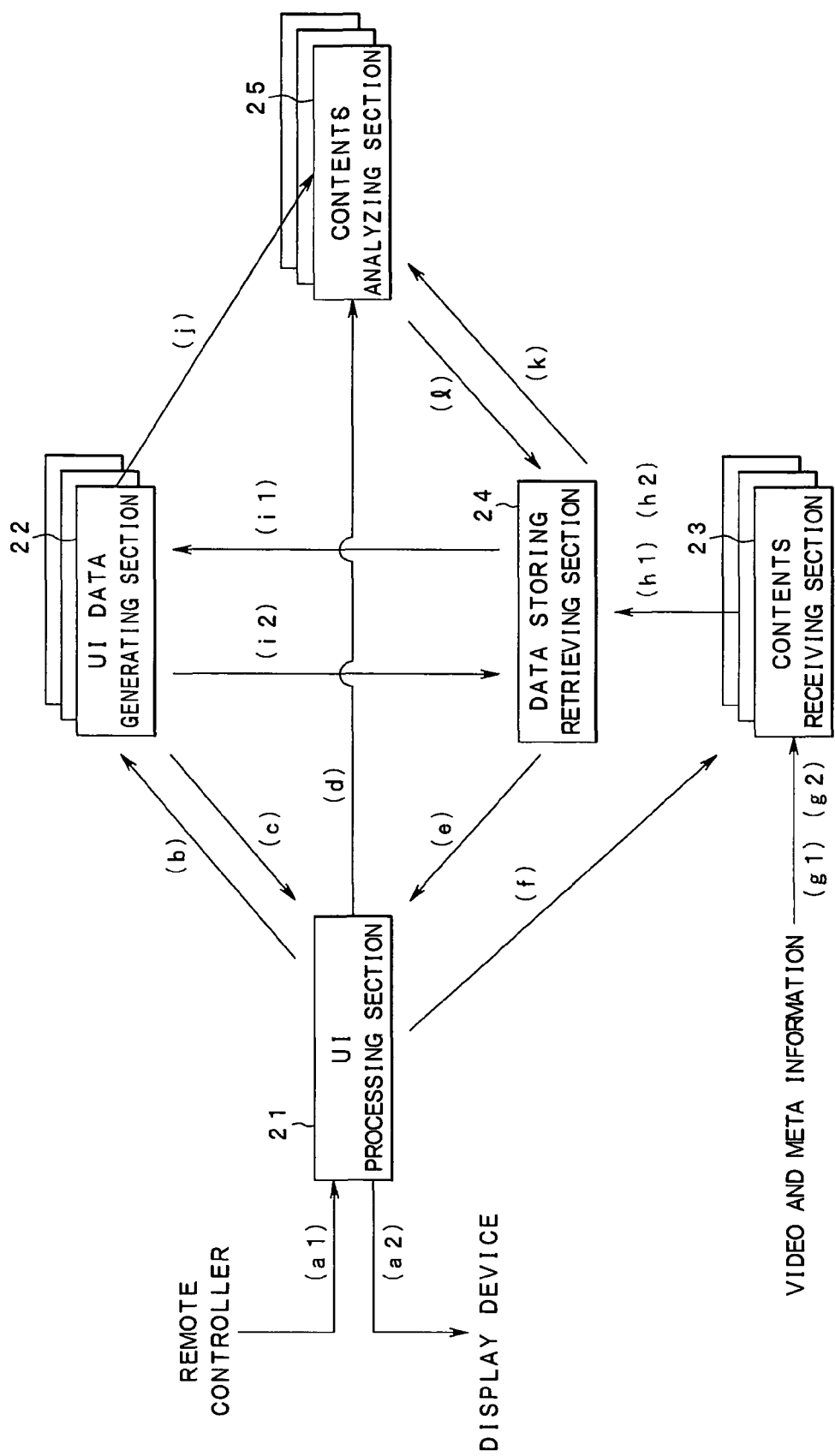
FIG. 3 is a processing block diagram of a video contents reproducing apparatus according to the embodiment of the present invention.

Description will be given of the contents of various processes executed by the control section 7 of the contents reproducing apparatus 1 configured as described above. FIG. 3 is a processing block diagram of the video contents reproducing apparatus 1.

As shown in FIG. 3, the control section 7 includes a user interface processing section (hereinafter referred to as a UI processing section) 21, a user interface data generating section (hereinafter referred to as a UI data generating section) 22, a contents receiving section 23, a data storing and extracting section 24, and a contents analyzing section 25. Each of the processing sections includes a software program executed by the CPU. In FIG. 3, the direction of flow of information is shown by an arrow, and an alphabet (letters in parentheses) shown close to the arrow denotes information described below.

The UI processing section 21 receives information on command signals (hereinafter referred to as command information) (a1) from, for example, the remote controller 11, operated by the user, to execute a process corresponding to the received command information. The command information (a1) is information on commands for generation of a graphical user interface (hereinafter referred to as a GUI) screen displayed by the display device 9, movement of a cursor, selection or retrieval of contents, retrieval of scenes, and the like.

The UI processing section 21 receives video information (c) from the UI data generating section 22 and information (e) such as video information from the data storing and extracting section 24. The UI processing section 21 then generates information required to generate a GUI screen and outputs the generated screen display information (a2) to the display device 9. The screen display information (a2) to be generated includes image information for three-dimensional graphic display displayed on the display device, described below. The UI processing section 21 thus executes, for example, a process which displays a thumbnail image row as textures, a process which, for three-dimensional display, synthesizes broadcasting or distribution schedule information data such as an electronic program guide (hereinafter referred to as an EPG) or the like and key frames, and a process which displays the EPG so that it moves three-dimensionally as the time elapses.

The UI processing section 21 can also execute the normal user interface processes of conventional HDD recorders, for example, recording, recording reservation, playback, and deletion.

The UI processing section 21 executes a process which transmits control information (b) required for the UI data generating section 22 to generate user interface data (hereinafter referred to as UI data), to the UI data generating section 22. The UI processing section 21 also receives video information (c) from the UI data generating section 22. The control information (b) is required to generate thumbnail images and to add chapter marks to specified video contents. The UI processing section 21 also executes processes such as sorting of various information on contents based on title names, genre names, the cast, and text codes. The UI processing section 21 also executes processes such as a change of displayed contents for each user. The process of changing displayed contents involves, for example, changing the contents of a displayed screen depending on whether the father or a child of a family is to view the screen.

The UI processing section 21 executes a process which transmits control information (d) for contents analysis to the contents analyzing section 25. As described later, the contents analyzing section 25 analyzes video contents to generate predetermined analysis information, on the basis of the user's instruction. The contents analyzing section 25 transmits the analysis information to the data storing and extracting section 24.

The UI processing section 21 executes a process which extracts video information (e) from the data storing and extracting section 24. The video information (e) contains not only video information on the contents but also a basic table, an extension table, and a program guide table. The read information is used to generate various screen information.

The UI processing section 21 further executes a process which transmits control information (f) required for the contents receiving section 23 to receive various information. The control information (f) contains information such as a channel, a program title, and a time zone which is required to specify contents to be stored.

The UI processing section 21 further holds information on a GUI screen described below, such as a view point position in a three-dimensional space, the direction of a center axis of a still image row, and the number of still images to be displayed.

As described below, the UI processing section 21 has processing functions that allow itself to serve as a contents information display section, a video contents display section, and a still image display section.

On the basis of the control information (f) from the UI processing section 21, the contents receiving section 23 executes a process which receives contents information on video contents such as EPG data which is distributed from the Internet 4, that is, meta information (g1), and video information (g2) such as broadcasting contents received via the antenna 2, contents distributed via a network such as the Internet 4, and contents read from recording media such as package media.

The contents receiving section 23 executes an encoding process on the received contents video information (g2) to compress the data on the basis of a predetermined scheme such as MPEG2 or H.264. The contents receiving section 23 outputs the encoded video information (h1) to the data storing and extracting section 24 to record the information in the HDD 8. The contents receiving section 23 creates a basic table and the like on the basis of the meta information (g1). The contents receiving section 23 outputs management information (h2) of as the basic table created and the like, to the data storing and extracting section 24 to record the information in the HDD 8.

The data storing and extracting section 24 executes a process which records the encoded video information (h1) and management information (h2) of the basic and extension tables and the like, which have been received from the contents receiving section 23 in HDD 8.

The data storing and extracting section 24 also executes a process which records key frame images, thumbnail image rows, EPG data, user favor information, and the like in the HDD 8. Each key frame image is an image representative of each content and can be read using link destination information in the basic table. A thumbnail image row is a plurality of still images for each content and can be read using link destination information in the extension table.

The UI data generating section 22 reads encoded video information (i1) from the data storing and extracting section 24 to generate a key frame image and a thumbnail image row. On the basis of the encoded video information (i1), the UI data generating section 22 outputs key frame image information and thumbnail image row information (i2) to the data storing and extracting section 24 to record the information in the HDD 8. The UI data generating section 22 generates also data for the extension table and outputs the data to the data storing and extracting section 24 to record it in the HDD 8.

As described below, the UI data generating section 22 has the ability to serve as a still image generating section and a still image information sequential-transmission section.

The contents analyzing section 25 receives the control information (d) for analysis based on the user's instruction or setting, from the UI processing section 21. The contents analyzing section 25 executes a process which creates extension table data on the basis of the received control information (d), the video information (j) from the UI data generating section 22, the meta information (g1) and encoded video information (k) from the data storing and extracting section 24. The contents analyzing section 25 executes processes such as analysis and recognition of video contents, analysis of the user's favors, and processing and generation of videos based on the analysis. The contents analyzing section 25 then outputs processed and generated video information and user's favor analysis information (1) to the data storing and extracting section 24 to record the information in the HDD 8.

Video details in the video contents are recognized or analyzed by determining, for example, the presence of a change to a particular color, the presence of a change in luminance by a predetermined amount, or the presence of a sound output of at least a predetermined volume, in a video to be reproduced. The recognition or analysis process may be a contents analyzing process which determines the user's favors on the basis of the history of operations of the contents, viewing history, or the like. The recognition of video contents or the like can also be realized by other techniques such as pattern recognition and scene analysis.

Moreover, a predetermined book mark may be applied to information on a video content determined to be a highlight scene, on the basis of the analysis, a recommended program guide table for the user may be created, or the like.

The data storing and extracting section 24 outputs information (e) of stored video information, a key frame image, a thumbnail image row, a basic table, an extension table, and a program guide table and the like to the UI processing section 21 in response to its request.

Of the processing sections in FIG. 3, the UI data generating section 22, contents receiving section 23, and contents analyzing section 25 are processing programs that can perform a parallel process operation under the control of CPU of the control section 7. Accordingly, for example, the UI data generating section 22 can simultaneously execute a plurality of processes for generating key frame images, for generating thumbnail image rows, for decompressing encoded images, or the like. The contents receiving section 23 can simultaneously execute a plurality of processes for receiving, encoding plural pieces of video contents information or the like. The contents analyzing section 25 can simultaneously execute a plurality of processes for analyzing and recognizing video contents, for analyzing the user's favors or the like.

FIG. 4 is a diagram illustrating the configuration of a basic table.

In the present embodiment, the basic table 31 is stored in the HDD 8 as a table and has a plurality of items including a program identifier (hereinafter referred to as a program ID) 31a, a channel number 31b, a broadcasting date 31c, a time code or a time zone (start time to end time) 31d, a program title 31e, a genre 31f, a one key frame 31g, and information 31h on a link to an extension table.

The data in the items of the basic table 31 are basically determined before or during recording (that is, during distribution of contents). For broadcasting programs, data such as a program title and a channel are extracted from the information in the EPG and determined before or during recording.

However, some of the data in the items are changed to data such as a recorded image and the actual broadcasting time, after recording. For example, the time zone 31d is a scheduled date and a scheduled time if the program has not been broadcast yet (that is, the program has not been recorded yet). In contrast, the time zone 31d is an actual date and an actual time if the program has been broadcast (that is, the program has been recorded). The one key frame 31g is, for example, the first frame after broadcasting (that is, after recording) and may be a distributed key frame or a pre-registered general-purpose image frame before broadcasting (that is, before recording).

Figure 5:
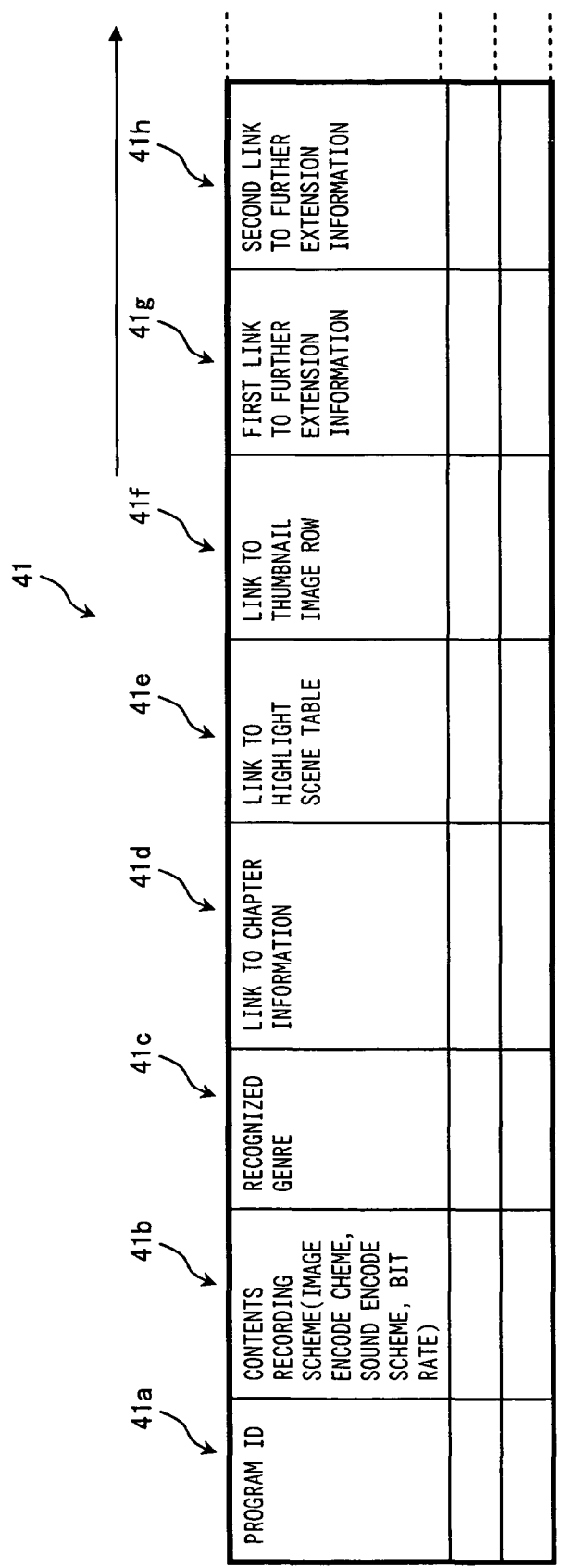
FIG. 5 is a diagram illustrating the configuration of an extension table according to the embodiment of the present invention.

FIG. 5 is a diagram illustrating the configuration of an extension table.

In the present embodiment, the extension table 31 is stored in the HDD 8 as a table and has a plurality of items including a program ID 41a, a contents recording scheme (video encode type/mode or image encode scheme, sound encode type/mode or sound encode scheme, or bit rate) 41b, a recognized genre 41c, a link 41d to chapter information, a link 41e to a highlight scene table, a link 41f to a thumbnail image row, a first link 41g to a further extension information, and a second link 41h to a further extension information.

The data in the items of the extension table 41 basically includes information of data the contents of which are possible to change and information resulting from processes in the system. For broadcasting programs, no data is present in the items before recording. Accordingly, the data in the items are recognized and written on the basis of data such as recorded images and the actual broadcast videos.

The information including data the contents of which are possible to change is recording information 41b such as a bit rate and a codec scheme. The information also includes a formal genre distributed during or after recording and casting members.

The information resulting from processes in the system is genre information 41c resulting from recognition of the user's favors through a learning function. The data in the items of the extension table 41 include various link information 41d, 41e, 41f, 41g, and 41h such as a link to chapter information. The information resulting from predetermined program processes in the contents reproducing apparatus 1 after recording includes a genre, appearance time marks for performers, highlight marks, chapter information, brightness for image processing, a luminance change line, a volume line, and what is called newness information indicating the topicality of news or the like.

The link information includes the information 41d on a link to chapter information, the link 41e to a highlight scene table, and the link 41f to thumbnail image row information. The link information also includes information added via an offline process or the like, for example, book mark information added by the user during viewing.

FIG. 6 is a diagram showing an example of a highlight scene common-information table.

In the present embodiment, a highlight scene common-information table 51 is stored in the HDD 8 and has a plurality of items including a program ID 51a, a recognition method or a recognition scheme 51b, and a highlight scene count 51c.

That is, the data in the items of the highlight scene common-information table 51 includes a specified recognition process scheme to be executed for each specified program and information on a highlight scene count resulting from the recognition process. Accordingly, the data in the items are information on the user specified recognition process scheme and on the number of highlight scenes resulting from the process.

When a highlight scene retrieving process is specified by the user, the contents analyzing section 25 subjects video information on the contents of a specified program to a specified recognition scheme, for example, a process program based on a recognition scheme called a "baseball chance recognizing scheme A" as shown in FIG. 6. The contents analyzing section 25 thus detects highlight scenes in the contents, and creates and records various data required to enable the user to easily retrieve the highlight scenes, in a highlight information table 61.

FIG. 7 is a diagram showing an example of the highlight information table 61, stored in the HDD 8. In the present embodiment, the highlight information table 61, which is generated for each program ID, has a plurality of items including a scene number 61a, a start time 61b, an end time 61c, a classification 61d, a determination value score 61e, and a viewing count 61f.

The data in the items of the highlight information table 61 are basically information on highlight scenes resulting from a recognition process as described above. The identification numbers of highlight scenes are recorded in the item of the scene number 61a. The start times of videos recognized as highlight scenes are recorded in the item of the start time 61b. The end times of the videos recognized as highlight scenes are recorded in the item of the end time 61c. The categories of the contents of the recognized scenes are recorded in the item of the classification 61d. The determined levels of the highlight scenes are recorded in the item 61e of the determination value score 61e. The number of times that the user has viewed the scene is recorded in the viewing count 61f.

That is, FIG. 7 shows an example of information resulting from recognition of highlight scenes of contents of a baseball program. Scene numbers are added to a plurality of highlight scenes recognized by the recognition scheme specified in the highlight scene common-information table 51 in FIG. 6. The information on the start and end times of each scene is then extracted. Moreover, the contents analyzing section 25 classifies the highlight scenes recognized by the specified recognition scheme into scoring, defense and attack scenes (offense scene). The contents analyzing section 25 further records information on the level of each highlight scene (probability of being a highlight scene) and on the user's viewing count, in the highlight information table 61. In the figure, the category of a scoring scene included in the attack scene is given priority over the attack scene.

The method for classifying the video information on the contents is not limited to identification of highlight scenes based on a change in video color, sound volume, or the like as described above but may be recognition of an announcer's words, learning of the user's favors, or the like.

FIG. 8 is a diagram showing an example of a thumbnail image row information table 71. In the present embodiment, the thumbnail image row information table 71 is stored in the HDD 8 as a table, is generated for each program ID or channel, and has a plurality of items. These items include an image number 71a, internal time code or intra-contents time 71b, image information 71c, and information 71d on a link to image data.

The data in the items of the thumbnail image row information table 71 are basically information obtained when the UI data generating section 22 generates a thumbnail image row as described above. The identification number of each thumbnail image is recorded in the item of the image number 71a. In-contents time data on that thumbnail image is recorded in the item of the intra-contents time 71b. The form, size, color depth or color bit count, or the like of the thumbnail image is recorded in the item of the image information 71c. Image identification data on the thumbnail image itself is recorded in the item of the link 71d to image data and used to read the thumbnail image recorded in the HDD 8.

Description has been given of the example in which the table is stored as it is. However, the table may also be stored in XML or hypertext form in association with videos, images, or meta data. Functions essential to the data storing scheme in the present embodiment include storage of both information determined during recording and information obtained after recording by analyzing or processing videos, and storage of thumbnail images (a row of a plurality of images) as meta data. The above various tables are used to associate video information in various screens with EPG information. The UI processing section 22 can search these tables for information required for screen display specified by the user to obtain linked information.

Now, a specific description will be given of functions of the above video contents reproducing apparatus 1.

In the example described below, the user sets the video reproducing apparatus 1 so that the contents of TV programs and the like broadcast through a plurality of channels are continuously recorded in the HDD 8 for, for example, 24 hours. The user then retrieves and reproduces a desired one of the plurality of programs continuously recorded through the predetermined channels for 24 hours.

In this case, the contents of all the programs on each of the specified channels are recorded. However, not all the programs need to be recorded but it is possible to record only contents selected on the basis of setting information such as a particular time zone, genre, or cast which is set by the user.

The contents receiving section 23 continuously receives information on the specified programs, that is, the contents, for 24 hours. The data storing and extracting section 24 records encoded information on the received contents in the HDD 8. The contents receiving section 23 carries out the reception as a parallel process.

The broadcast or distributed contents are recorded in the HDD 8. Predetermined data input, distributed, generated or the like before, during, and after recording are stored in the basic (FIG. 4) and extension (FIG. 5) tables in the HDD 8.

In particular, the following is recorded in the extension table (FIG. 5): information resulting from a recognition process executed on the basis of the user's specification, for example, from the above highlight scene recognizing process.

Now, description will be given of the case where the user retrieves and views a program from the plurality of contents recorded in the HDD 8. To retrieve a desired one of the plurality of contents recorded in the HDD 8, the user operates the remote controller 11 or an operation panel (not shown) to give the contents reproducing apparatus 1 a command causing the display device 9 to display a screen for contents retrieval.

Figure 9:
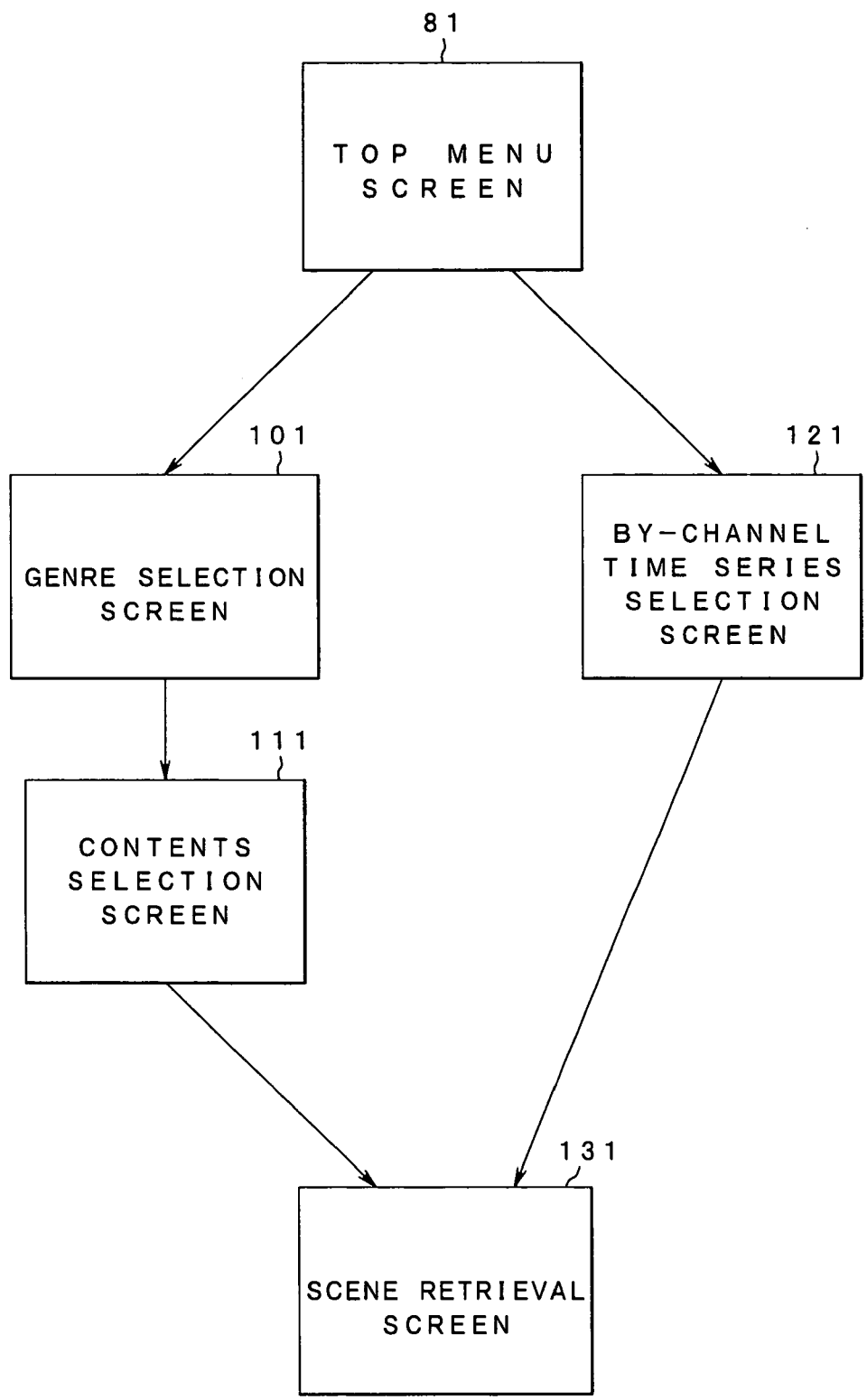
FIG. 9 is a diagram illustrating screen transitions of a GUI screen according to the embodiment of the present invention.

FIG. 9 is a diagram illustrating screen transitions of a GUI screen used to retrieve contents or scenes in the video contents reproducing apparatus 1.

Figure 13:
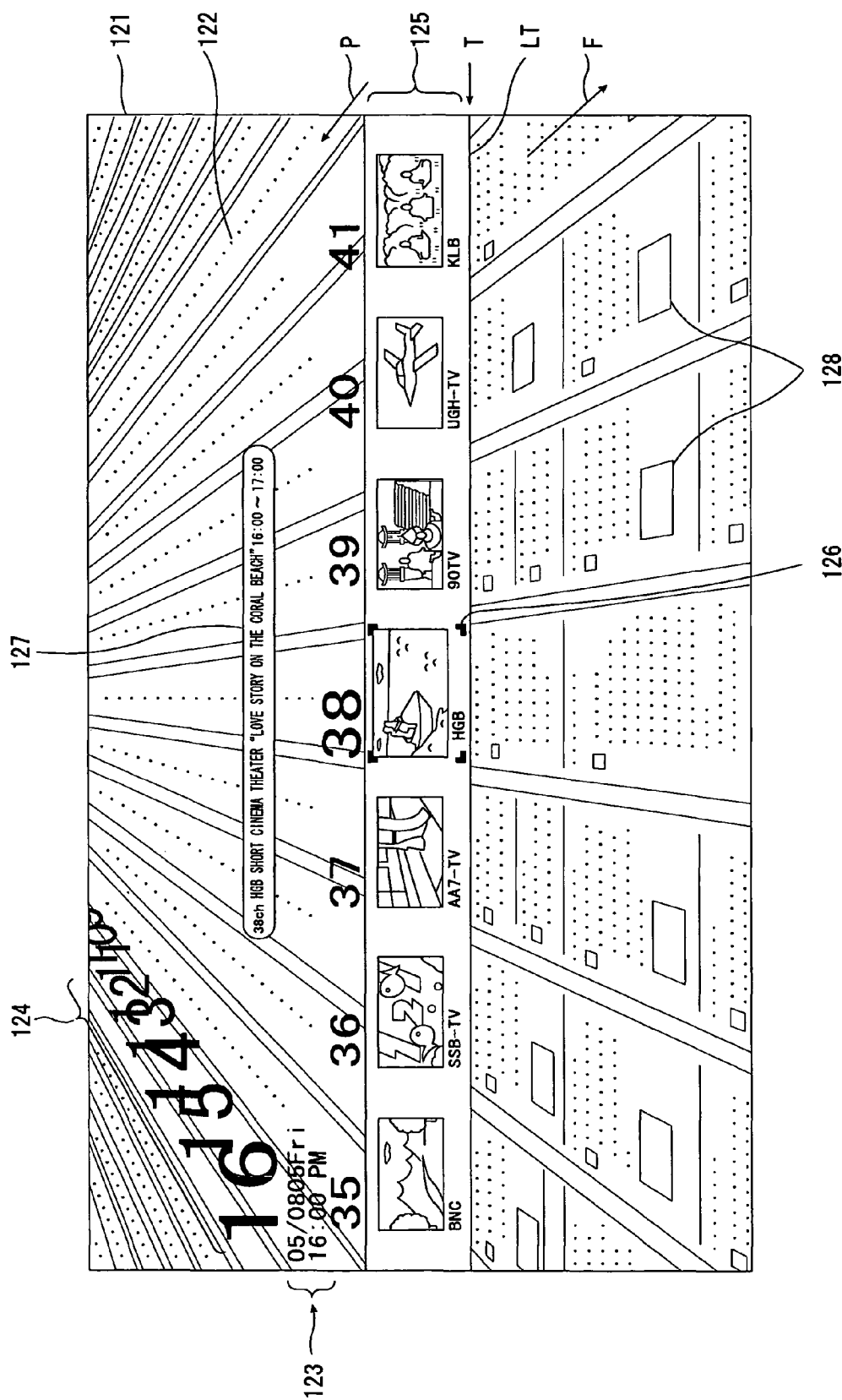
FIG. 13 is a diagram showing another example of a contents retrieval screen according to the embodiment of the present invention.

FIG. 9 shows only transitions to screens related to the present embodiment, though transitions from a top menu to various functional screens are possible. As shown in FIG. 9, the user can change the display screen of the display device 9 from a top menu screen 81 to a genre selection screen 101 (FIG. 1) or to a by-channel time series retrieval screen 121 (FIG. 13). The user can move through the screens by performing predetermined operations on the remote controller 11.

Figure 11:
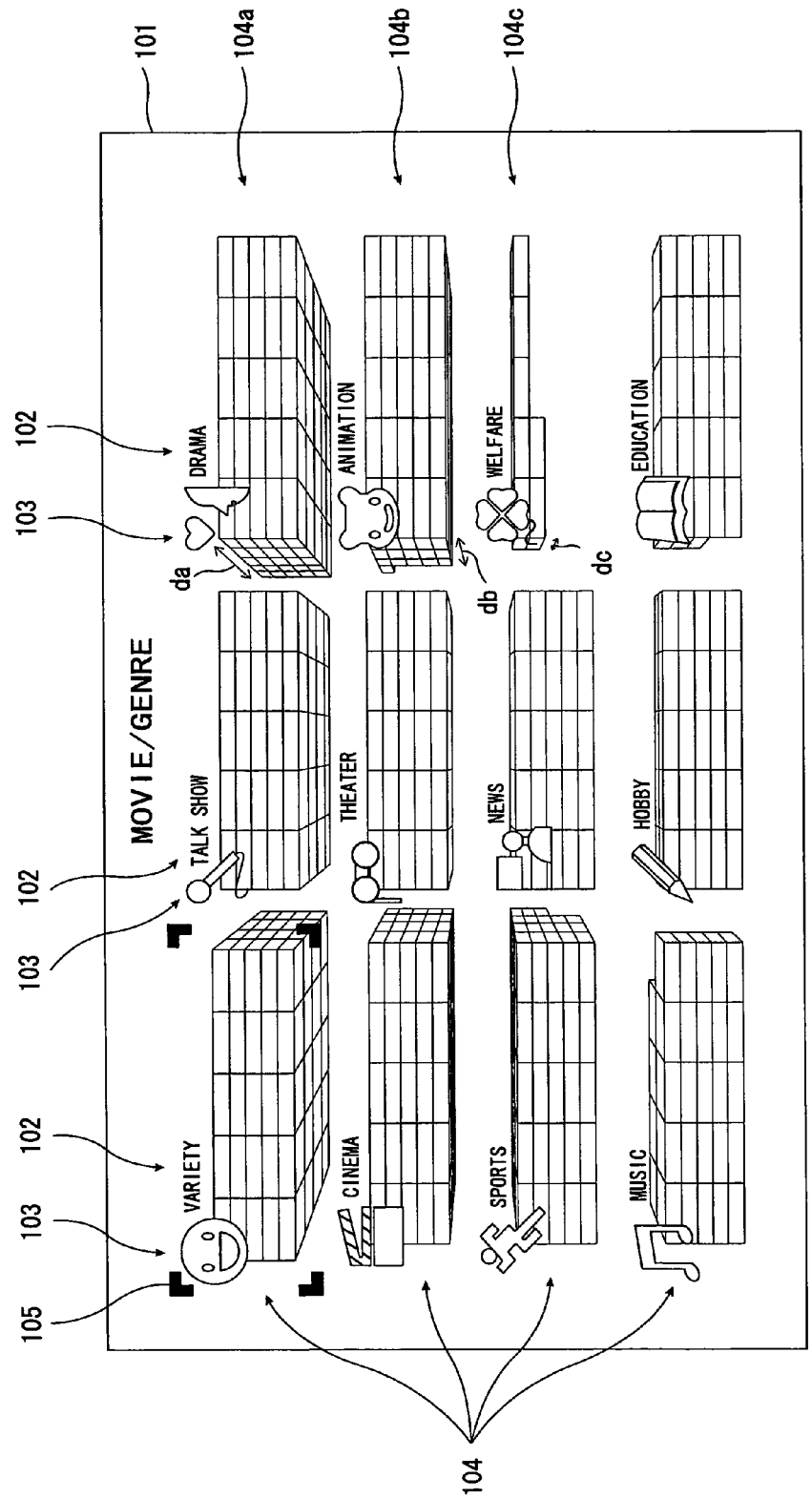
FIG. 11 is a diagram showing an example of genre selection screen according to the embodiment of the present invention.
Figure 12:
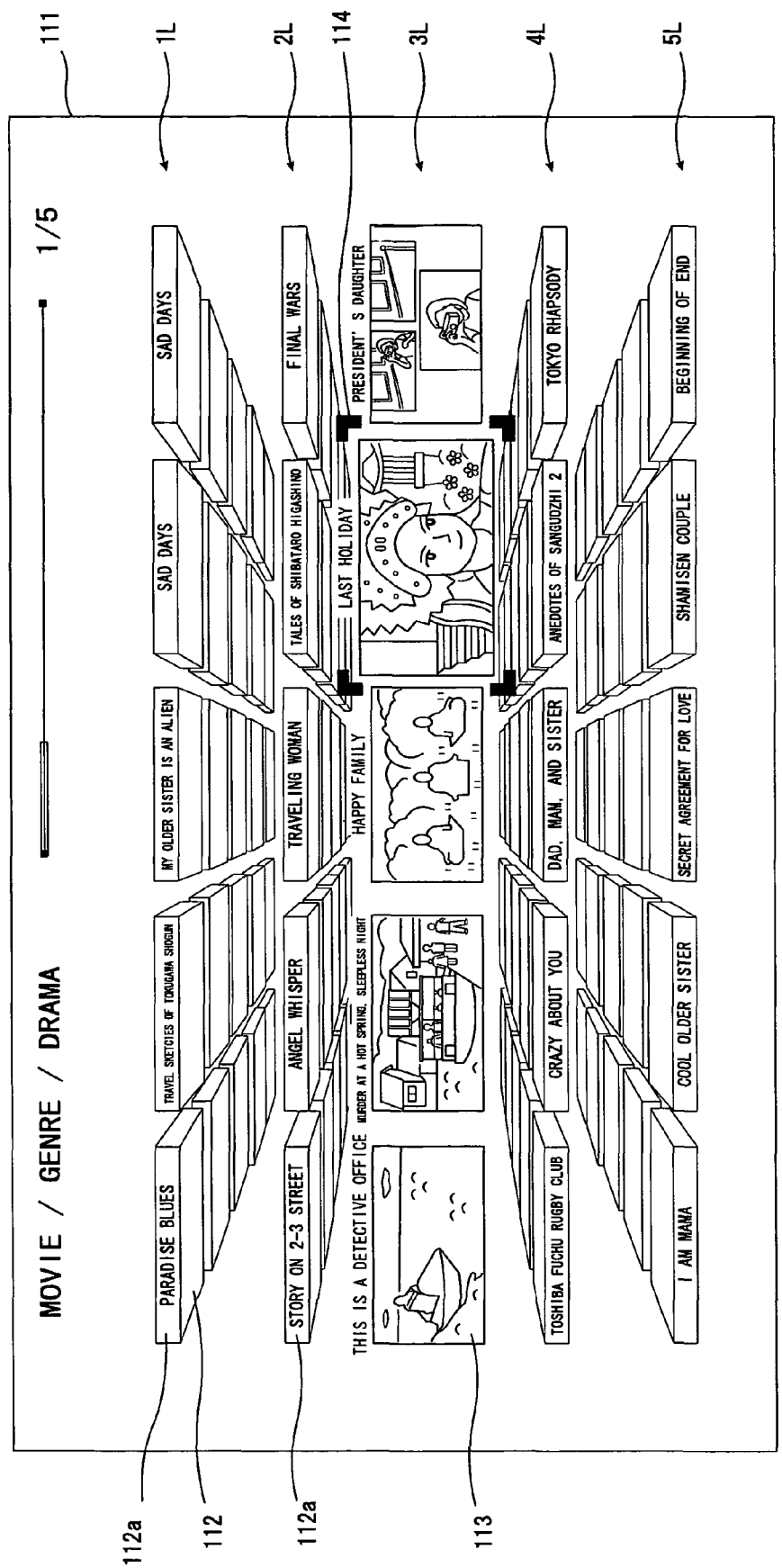
FIG. 12 is a diagram showing an example of a contents retrieval screen according to the embodiment of the present invention.
Figure 15:
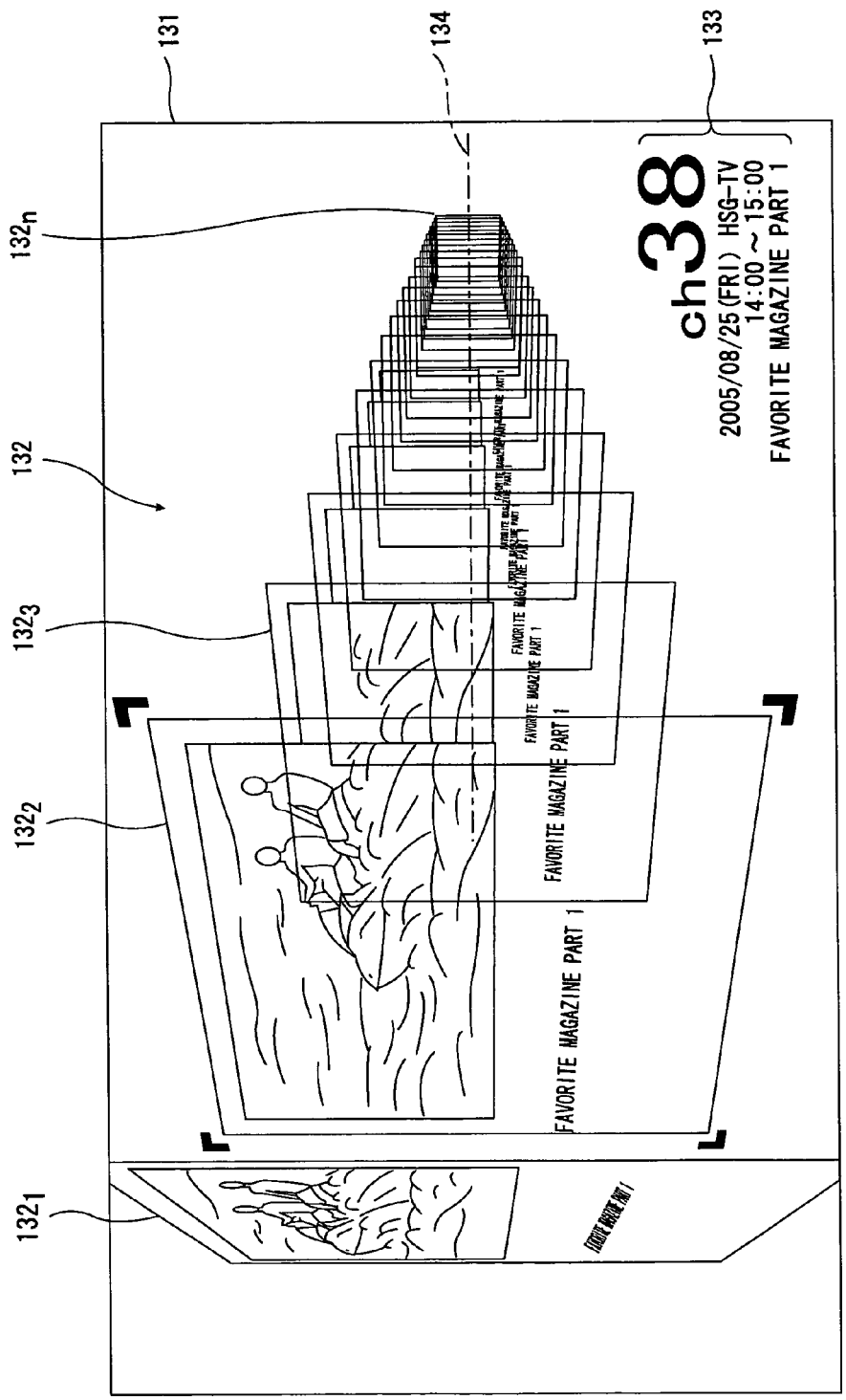
FIG. 15 is a diagram showing an example of a scene retrieval screen according to the embodiment of the present invention.

Similarly, the user can operate the remote controller 11 to move from the genre selection screen 101 (FIG. 11) to a contents retrieval screen 111 (FIG. 12). The user can then operate the remote controller 11 to move from each of the contents retrieval screen 111 (FIG. 12) and by-channel time series retrieval screen 121 (FIG. 13) to a scene retrieval screen 131 (FIG. 15).

Now, with reference to FIG. 10, a plurality of operation keys on the remote controller 11 will be described. In the present embodiment, as described later, three-dimensional screen display needs to be operated. Consequently, the plurality of operation keys include not only a normal up, down, right, and left keys but also a key specifying movement in a depth direction.

Figure 10:
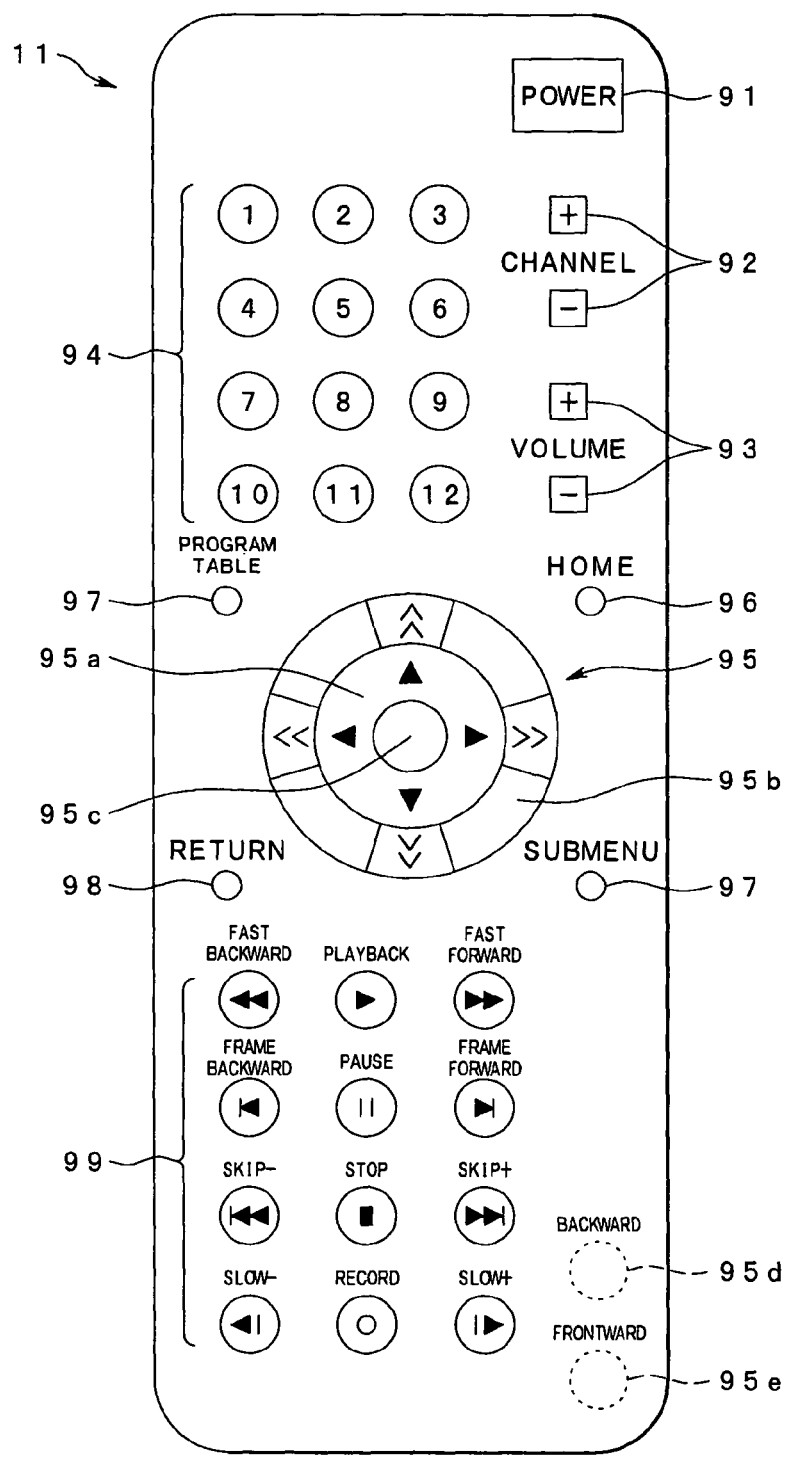
FIG. 10 is a plan view of a remote controller according to the embodiment of the present invention.

FIG. 10 is a plan view of the remote controller 11 showing an example of a key arrangement on the remote controller 11. A plurality of buttons and keys which can be operated by the user's fingers are arranged on the surface of the remote controller 11.

The remote controller 11 includes a power supply button 91, a channel switching button 92, a volume change button 93, a channel direct-switching button 94, a cross key 95 used to move the cursor upward, downward, rightward, and leftward, a home button 96, a program guide table button 97, a submenu button 97, a return button 98, and a recording and reproduction function key group 99.

The cross key 95 has two ring-shaped keys (hereinafter referred to as ring keys) 95a and 95b. The inside ring key 95a is used to move the cursor upward, downward, rightward, and leftward. The outside ring key 95b has, for example, a function that specifies a frontward and backward directions in a three-dimensionally displayed screen. An execution key 95c for a selection function, that is, an execution function, is provided inside the inside ring key 95a.

In this case, the two ring keys 95a and 95b are used to specify the frontward and backward direction in three-dimensional display. However, as shown by broken lines in FIG. 10, independent dedicated buttons 95d and 95e may be provided on the remote controller 11 to specify the frontward and backward directions.

The user can transmit various commands while viewing the display screen of the display device 9 to operate the remote controller 11.

An operation and a process for each screen will be described below with reference to specific examples.

For example, to select a content from dramas that are movies, the user operates buttons on the remote controller 11, for example, a home button 96, to transmit, to the contents reproducing apparatus 1, a predetermined command causing the display of a menu screen from which a movie genre can be selected. Upon receiving the command, the contents reproducing apparatus 1 displays such a screen as shown in FIG. 11, on the display device 9. Specifically, the command from the remote controller 11 is input to and processed by the UI processing section 21. The UI processing section 21 determines that the command causes the movie genre to be selected, and reads data such as the basic table which are stored in the HDD 8 to sort the data by genre. The UI processing section 21 then executes a process which generates the screen in FIG. 11.

In this case, the movie contents are classified according to genres. However, the movie contents may be classified on the basis of information in another item of the basic table or information in an item of the extension table.

FIG. 11 is a diagram showing an example of a genre selection screen that allows the user to select a subgenre such as a variety, cinema, or drama from the movie genre contents.

The screen in FIG. 11 shows the number of recorded programs for each genre in blocks. In FIG. 11, 12 genres are each shown as a mass shaped like an island comprising a plurality of stacked rectangles. Each island is shown to indicate the number of recorded programs in terms of the number of stacked rectangles. The rectangles are stacked in a 5×5 matrix as well as in the depth direction, that is, in three-dimensional display. The stacking is based on the count calculated during the sorting.

More specifically, a genre selection screen 101 displays a plurality of, in this case, 12 genres as a mass of island together with a genre name 102 and an icon 103 corresponding to the genre. The plurality of islands are shown in, in this case, a 4×3 matrix (4 rows and 3 columns). Each island is three-dimensionally displayed so that the plurality of rectangular blocks are stacked in a three-dimensional space. Moreover, each island is displayed as a set of 5×5×5 (5 rows and 5 columns as well as 5 blocks in the depth direction) rectangular parallelepiped blocks. An island 104a for the drama genre is displayed as a set of 5×5×5 (5 rows and 5 columns as well as 5 blocks in the depth direction) rectangular parallelepiped blocks. FIG. 11 shows that the maximum depth is 5. However, the number of blocks in the depth direction varies depending on the number of contents in each island. Thus, in FIG. 11, with an increase in the number of contents in an island, the number of blocks in the depth direction is determined by dividing the number by 25 to obtain an integral value and then adding 1 to this value. An animation island 104b is displayed as a set of 5×5×5 (or 4) (5 rows and 5 columns as well as 5 or 4 blocks in the depth direction) rectangular parallelepiped blocks. A welfare island 104c is displayed as a set of 2×5 (or 2)×1 (2 rows and 5 or 2 columns as well as 1 block in the depth direction) rectangular parallelepiped blocks.

One block shows one content. When each island has a plurality of contents, the number of contents is shown by a set of blocks in a predetermined matrix (in this case, 5×5). If the number of contents increases and exceeds that in the predetermined matrix (in this case, 5×5), it is shown by a set of three-dimensional blocks stacked in the depth direction.

In particular, the UI processing section 21 displays each island so that it appears like a set of three-dimensional blocks to the user at one point of sight as shown in FIG. 1. Since the number of contents in each genre is shown not only by rows and columns but also by a length d in the depth direction, the user can intuitively determine how many contents have been accumulated in each genre. For example, the drama island 104a has five blocks in the depth direction da. The animation island 104b has four or five blocks in the depth direction db. The welfare island 104 has one block in the depth direction dc. The user can thus clearly determine a difference in contents amount among the islands.

As described above, the above genre selection screen is generated by the UI processing section 21 by using the genre information read from the basic table (FIG. 4) in the HDD 8 to classify the contents recorded in the HDD 8. The number of contents in each category obtained by the classification process is counted.

The number of blocks in each island is determined on the basis of the count. Then, on the basis of pre-specified and stored point of sight information, the UI processing section 21 generates an image of a set of three-dimensional blocks for each island and outputs the generated image information for the genre selection screen (FIG. 11) to the display device 9.

Consequently, when a plurality of contents are displayed in a list in the screen in FIG. 11, related contents are grouped on the basis of predetermined information. The number of contents in each group is then three-dimensionally expressed. The user can thus easily understand the number of contents.

It is assumed that in the genre selection screen in FIG. 11, the user operates the ring key 95a on the remote controller 11 to move the cursor 105 to select the drama island 104a. The command for the selection operation is input to the UI processing section 21. The UI processing section 21 then determines that the command causes a content to be selected from the drama genre and reads data such as the basic table which are stored in the HDD 8. The UI processing section 21 further generates a screen in FIG. 12.

FIG. 12 is a diagram showing an example of a contents retrieval screen that allows the user to retrieve a viewing target content from the plurality of contents belonging to the drama genre.

A contents retrieval screen 111 in FIG. 12 displays a plurality of contents in a list in which each drama is shown as a three-dimensional rectangular parallelepiped block 112. In FIG. 12, 25 drama titles are each shown on a surface 112a of the corresponding block 112 or close to the corresponding thumbnail image 113. The contents retrieval screen 111 in FIG. 12 displays a plurality of dramas generally as a plurality of (5×5×5; 5 rows and 5 columns as well as 5 blocks in the depth direction) rectangular parallelepiped blocks. Specifically, a plurality of dramas corresponding to the drama island 104a in the screen in FIG. 11 are displayed in upper two and lower two rows (that is, the first, second, fourth, and fifth rows) of the contents retrieval screen 111 in FIG. 12, as a set of a plurality of (5×5; 5 rows as well as 5 blocks in the depth direction) rectangular parallelepiped blocks. Moreover, for five dramas at a predetermined position on the screen, in this case, in a central row (that is, the third row), not only their titles but also recorded drama videos displayed as motion picture thumbnails are shown. The five thumbnails are two-dimensionally displayed in the central row (that is, the third row). However, this row virtually contains 5×5 (5 rows as well as 5 blocks in the depth direction) drama contents, and the dramas located behind the two-dimensionally displayed thumbnails are not shown. Accordingly, in FIG. 12, only the dramas displayed in the third row 3L as motion picture thumbnails are not shown as three-dimensional rectangular parallelepiped blocks.

To select a desired one of the plurality of recorded dramas, the user can operate the ring key 95a on the remote controller 11 to move the cursor in both horizontal and vertical direction of the screen. An operation method for this selection will be described below. In the example below, 125 dramas are recorded and displayed as 5×5×5 (5 rows and 5 columns as well as 5 blocks in the depth direction) rectangular parallelepiped blocks.

For example, depressing a right or left part of the ring key 95a on the remote controller 11 moves the cursor 114 in the horizontal direction of the screen in association with the key operation. The user can thus change the selected drama in the contents retrieval screen 111 in FIG. 12. Similarly, depressing an upper or lower part of the ring key 95a on the remote controller 11 changes the row displayed as motion picture thumbnails, in association with the key operation. In the description below, the middle row in the vertical direction, that is, the third row is entirely displayed as motion picture thumbnails. However, in the thumbnail display, all the (in this case, five) contents in the middle row do not need to be in motion picture form but some of them may be still images.

For example, in the state in FIG. 12, depressing the upper part of the ring key 95a displays the middle row, the third row (3L), as rectangular parallelepiped blocks with the respective titles. The second row (2L) is displayed as motion picture thumbnails. Further depressing the upper part of the ring key 95a displays the first row (1L) as motion picture thumbnails. In this case, the other rows are displayed as rectangular parallelepiped blocks with the respective titles. Similarly, depressing the lower part of the ring key 95a in the state shown in FIG. 12 displays the fourth row as motion picture thumbnails. That is, operating the upper or lower part of the ring key 95a changes the position of the row displayed as motion picture thumbnails.

Thus, the cursor 114 moves in the horizontal and vertical directions according to the key operations. The user can thus switch among the selectable dramas in the contents retrieval screen 111 in FIG. 12.

This results in such display as shown in FIG. 12, in which the row containing selectable contents is displayed as thumbnails with the other rows displayed simply as text information such as titles. This enables more contents to be efficiently arranged in one screen, and the user can easily compare the selectable contents with contents located near them.

Operating the ring key 95b on the remote controller 11 enables the display of 25 dramas following the current 25 dramas. The screen in FIG. 12 has a page display section indicating, in the upper right in the screen, that the mass in the screen amounts to one-fifth of the 125 dramas.

For example, depressing the upper part of the ring key 95b displays a 25-drama page (2/5) located behind the foremost 25-drama page (1/5), on the foremost surface. The 25-drama page (1/5) previously displayed on the foremost surface virtually moves to the remotest surface. Further depressing the upper part of the ring key 95b displays a 25-drama page (3/5) located behind the foremost 25-drama page (2/5), on the foremost surface. The 25-drama page (2/5) previously displayed on the foremost surface virtually moves to the remotest surface. As a result, the second page (in the depth direction (3/5)) from the initially displayed 25-drama page (1/5) shown in FIG. 12 is displayed on the foremost surface. The initially displayed 25-drama page (1/5) shown in FIG. 12 virtually moves to the remotest surface but one.

In contrast, depressing the lower part of the ring key 95b in this state (in which the page (3/5) is displayed on the foremost surface) displays the 25-drama page (2/5) virtually located at the remotest surface, on the foremost surface. The 25-drama page (3/5) previously displayed on the foremost surface virtually moves to the surface behind the foremost surface. Further depressing the lower part of the ring key 95b displays the 25-drama page (1/5) virtually located at the remotest surface, on the foremost surface. The 25-drama page (2/5) virtually located at the foremost surface virtually moves to the surface behind the foremost surface. This brings the screen into the initial display state shown in FIG. 12.

As described above, focusing in six directions can be executed on the screen in FIG. 12; extra contents that do not fit in one screen are contained in the second and subsequent stacked pages, and the focusing is achieved by three-dimensionally expressing the stacked pages to enable virtual movement in the depth direction. Consequently, the user can easily and intuitively understand and easily manipulate page transitions.

Instead of still images, motion picture thumbnails are displayed in the third row to show the contents. This allows the user to determine the desired content more easily than in the prior art, in which only one representative still image is displayed. In the prior art, in which only still images are displayed, the user must repeat selection and viewing and cannot perform efficient retrieval operations. However, the present embodiment enables the user to perform efficient operations.

With the screen in FIG. 12 displayed, depressing any of the function buttons on the remote controller 11 executes the corresponding function; the functions buttons include playback, reverse playback, fast-forward playback, fast-forward reverse playback, and playback pause. In other words, the plurality of (in this case, five) motion pictures in the third row displayed as motion picture thumbnails are simultaneously changed depending on the depressed function button on the remote controller 11, that is, such as playback, reverse playback, or fast-forward playback. Therefore, the user can easily and quickly retrieve the desired content.

A process of generating the screen in FIG. 12 is executed by the UI processing section 21 by reading video information on the contents via the UI data generating section 22 and on the basis of information from the basic table.

In listing a plurality of contents, the screen in FIG. 12 also three-dimensionally expresses the amount of stored contents, which facilitates the user's determination of the amount of the stored contents.

The user can then perform a predetermined operation on the remote controller 11 to display such a retrieval screen as shown in FIG. 13. This figure shows another example of a contents retrieval screen that allows the user to retrieve a desired one of a plurality of contents. The contents retrieval screen in FIG. 13 is a by-channel time series retrieval screen which lists a plurality of contents and which displays contents by channel according to time series.

The by-channel time series retrieval screen 121 is looked as a whole as if a two-dimensional program guide table 122 were viewed from a predetermined point of sight (view point). In the present embodiment, in which programs on a predetermined channel are continuously recorded for 24 hours, each by-channel program section displays a plurality programs arranged according to the time series so that programs broadcast later than a certain time T are displayed frontward, while programs broadcast earlier than the time T are displayed backward. The time indicated by the direction of abscissa is the same for all the by-channel program sections. Accordingly, in each by-channel program section, pieces of information on the programs are arranged along the predetermined time axis (extending from back to front) as in the case of a timetable.

The by-channel time series retrieval screen 121 has a time display section 123 that displays the time T. The time display section 123 includes a display section that displays year, month, day, time, minute, day of the week, and morning or afternoon. The by-channel time series retrieval screen 121 has a time display section 124 that displays time on the side of the two-dimensional program guide table 122, in this case, only the time. FIG. 13 shows time earlier than the certain time T, that is, time returned before the certain time T, for example, 1600 and 1500 hours, along the depth direction.

The by-channel time series retrieval screen 121 includes the band-like program sections for the respective broadcasting or distribution channels which are arranged along the abscissa and which extend from back to front of the screen. That is, in a virtual sense, the plurality of band-like program sections are two-dimensionally arranged. The displayed channels (in FIG. 13, channels 35 to 41) are some of the channels being currently broadcast and recorded. When viewing the screen, the user sees the program sections for the respective channels in which pieces of contents information on the programs, or contents, are arranged so that the time goes back (returns to the past) from front to back of the screen as shown by arrow P. Specifically, the program sections are displayed so that the pieces of information indicating the contents of the programs for the respective channels are shown like bands in the two-dimensional plane along the time axis and in association with the elapsed time. The program sections are also displayed as the two-dimensional program guide table 122 as viewed from a predetermined point of sight in a three-dimensional space, from upper front to back of the screen. Consequently, the band-like program sections are displayed like trapezoids such that program contents located closer to the user are shown larger, whereas program contents located further from the user are shown gradually smaller.

A motion picture thumbnail display section 125 is displayed in a central portion of the screen; the motion picture thumbnail display section 125 displays, as motion picture thumbnails, the contents of the programs on a plurality of (in this case, seven) channels arranged on the respective program sections in the lateral direction.

The motion picture thumbnail display section 125 displays a plurality of motion picture thumbnail videos on a lateral line LT indicating the certain time T. The motion picture thumbnail display section 125 two-dimensionally displays the thumbnail videos, that is, like tiles. Since the certain time T varies with the elapsed time, the two-dimensional motion picture thumbnail display section 125 appears to stand on the line LT on the two-dimensional program table 122. However, as the time elapses in synchronism with reproduction of the motion pictures in the motion picture thumbnail display section 125, the two-dimensional motion picture program guide table 122 moves from front to back of the screen (direction shown by arrow P). On this occasion, the position of the motion picture thumbnail display section 125 on the screen remains unchanged. However, the contents of time display of the time display section 123, showing the time T, vary.

In the screen shown in FIG. 13, when the user operates the ring key 95a on the remote controller 11, the cursor 126 moves rightward or leftward depending on the operation. This enables the selectable currently broadcast programs or recording contents to be changed. Similarly, in the screen shown in FIG. 13, when the user operates the ring key 95b on the remote controller 11, the two-dimensional program guide table 122 moves from front to back (direction of arrow P) or back to front (direction of arrow F) of the screen depending on the operation while the position of the cursor 126 remains unchanged. At this time, the time corresponding to the line LT on the program guide table 122 also varies. The contents of display of the time display section 123 also vary as the two-dimensional program guide table 122 moves. In other words, the time display section 123 displays the broadcast time of the videos shown in the motion picture thumbnail display section 125.

Specifically, if the time T is the current time, the motion pictures displayed in the motion picture thumbnail display section 125 are being broadcast and recorded and vary with the time. The UI processing section 21 receives information on the currently received programs via the UI data generating section 22. The UI processing section 21 then displays the information in the motion picture thumbnail display section 125.

However, when the upper part of the ring key 95b on the remote controller 11 is depressed to change the time T so that the time goes back, the UI processing section 21 reads programs broadcast at the time corresponding to the changed time T, that is, video information on the recorded contents. The UI processing section 21 then displays the video information in the motion picture thumbnail display section 125.

When the lower part of the ring key 95b on the remote controller 11 is depressed to change the past time T so that the time advances, the UI processing section 21 reads video information on the contents broadcast at the time corresponding to the changed time T. The UI processing section 21 then displays the video information in the motion picture thumbnail display section 125. If the time advances beyond the current time, thumbnails accompanying the EPG data or a representative image of similar recorded contents, or arbitrary prepared images in the motion picture thumbnail display section 125.

A change in time T moves the band-like program sections in accordance with the changed time.

The videos displayed in the motion picture thumbnail display section 125 are broadcast and distributed at the same time. The user can retrieve a program while comparing a plurality of programs broadcast at the same time, with one another.

Still images may be included in the plurality of videos displayed in the motion picture thumbnail display section 125.

FIG. 13 shows the program sections for the channels 35 to 41 as bands extending from front to back of the screen. However, depressing the left or right part of the ring key 95*b* on the remote controller 11 enables the display of program sections for channels to the left of the channel 35 or to the right of the channel 41.

With the screen in FIG. 13 displayed, depressing any of the function buttons on the remote controller 11 allows the corresponding function to be executed; the functions buttons include playback, reverse playback, fast-forward playback, fast-forward reverse playback, and playback pause. In other words, the plurality of motion pictures in the motion picture thumbnail display section 125 are simultaneously changed depending on the depressed function button on the remote controller 11, that is, the selected function such as playback, reverse playback, or fast-forward playback. Therefore, the user can easily and quickly retrieve the desired content.

The by-channel time series retrieval screen 121 is further provided with a program contents information display section 127 that displays EPG data on the contents to which the videos shown by the motion picture thumbnails selected via the cursor 126 belong. The program contents information display section 127 shows information including the broadcasting channels, broadcasting stations, titles, and time zones of the contents to which the videos shown by the motion picture thumbnails selected belong.

The program sections also may display thumbnails of still images 128 as program contents information.

If the time T is the current time, the videos displayed in the motion picture thumbnail display section 125 in the central portion of the screen in FIG. 13 are the currently broadcast or distributed programs as described above. In this case, the by-channel program sections display future programs in the front of the screen. Consequently, even if the user operates the remote controller 11 to select the fast forward function or the like, that function is not executed.

Moreover, if the time T is the current time, then in the screen in FIG. 13, the back of the EPG displays the contents of past stored programs. The motion picture thumbnail display section 125 shows the contents being currently broadcast, with the front of the EPG displaying the contents of future programs. Accordingly, the part displaying the contents of future programs is generated on the basis of the information in a broadcast schedule such as the EPG or a distribution schedule. The screen in FIG. 13 thus lists contents, on different days at different times, that can be viewed, on one screen. Therefore, the user can easily retrieve contents to be viewed or reserved for viewing.

If the time T is the current time, not all of the past, current, and future contents need to be displayed. A combination of display contents may be changed; it is possible to display a combination of the current and past contents or the current and future contents.

Figure 14:
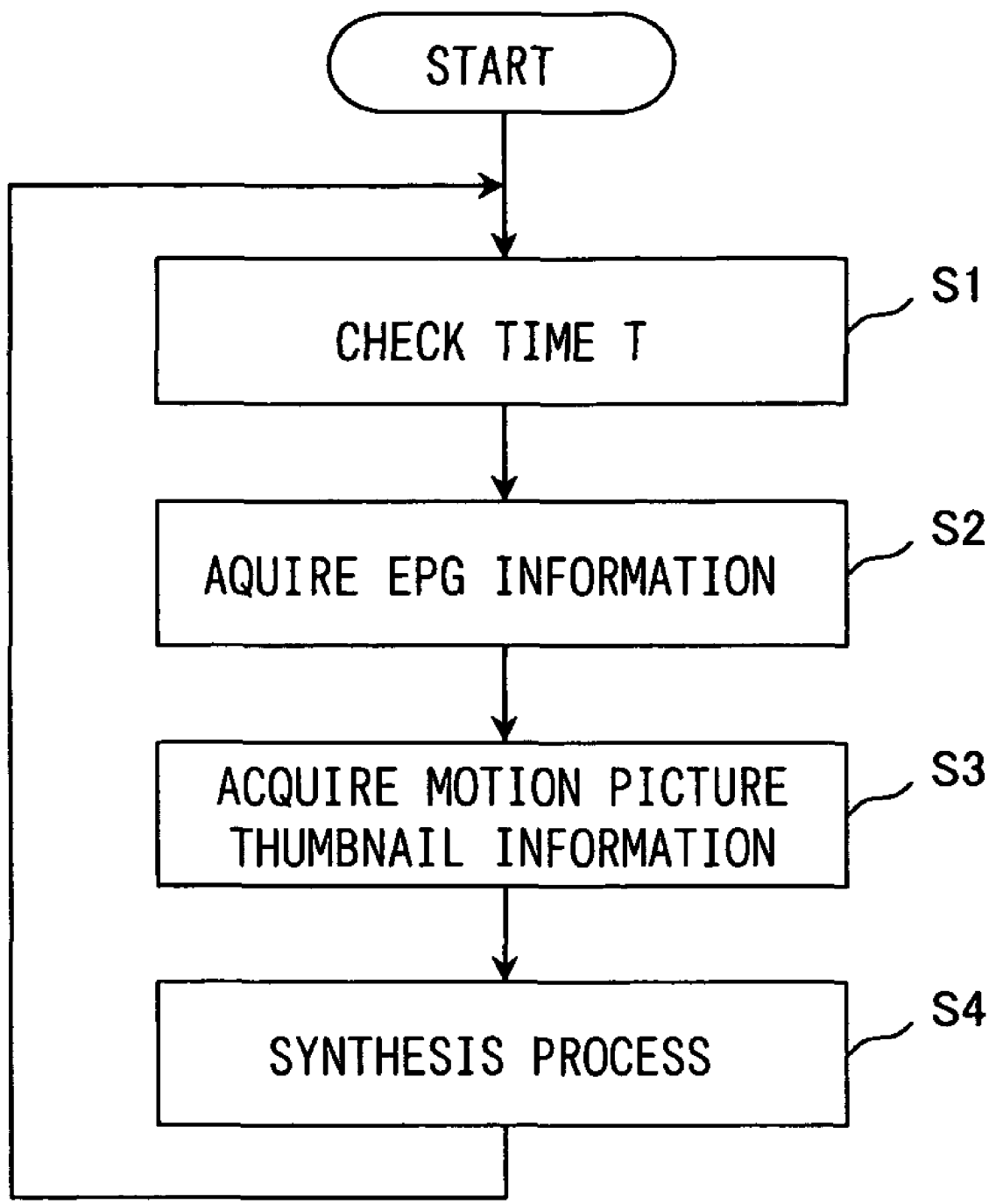
FIG. 14 is a flowchart showing the exemplary flow of a process of generating a screen in FIG. 13.

FIG. 14 is a flowchart showing the flow of process of generating the screen in FIG. 13. The user gives an instruction for generating a process of the by-channel time series retrieval screen 121 in FIG. 13. Then, the process in FIG. 14 is executed for each displayed channel on the basis of preset setting information required to display the screen in FIG. 13. As described above, a parallel process is simultaneously executed on a plurality of channels.

First, the UI processing section 21 checks the display time T on the basis of the setting information (step S1). The UI processing section 21 then acquires EPG information on the basis of the information on the time T (step S2). The UI processing section 21 acquires video picture or motion picture thumbnail information relating to the EPG information obtained (step S3).

The UI processing section 21 then executes a synthesis process of generating the three-dimensional display images in FIG. 13, on the basis of the EPG and motion picture thumbnail information acquired, set point of sight information, and the like (step S4). The synthesis process involves embedding contents information in a two-dimensional program guide table, pasting still-image thumbnails to the program guide table, and establishing a display form in which the program guide table is displayed as viewed from a predetermined point of sight as shown in the screen in FIG. 13. Accordingly, the synthesizing operation in step S4 constitutes a contents information display section that displays contents information along the time axis on the screen. The processes of acquiring and synthesizing the motion picture thumbnail information in steps S3 and S4 constitute a video contents display section that displays video contents as motion pictures or still images.

The procedure returns to step 1 and the process is repeated.

Further, for the content to which the video shown by the motion picture thumbnail selected in the screen in FIG. 12 or 13 belongs, the user depresses the submenu button 97 on the remote controller 11 to display a predetermined submenu. The user selects a "scene retrieval" from the submenu. A scene retrieval screen such as the one shown in FIG. 15 is then displayed. FIG. 15 is a diagram showing an example of a scene retrieval screen that allows the user to retrieve scenes from the selected channel or content.

The scene retrieval screen in FIG. 15 is also generated and displayed on the display device 9 by the UI processing section 21 in response to a command input through the remote controller 11.

In response to the command, the UI processing section allows the video information on contents specified by the data storing and extracting section 24 to be read into the UI data generating section 22. The UI processing section 21 then has the UI data generating section 22 generate a thumbnail image row (image series) on the basis of the video information read.

A scene retrieval screen 131 has a thumbnail image example display section 132 in which a plurality of images in a thumbnail image row are arranged along the time elapse from front to back of the screen and a contents information display section 133 that displays contents information such as the titles of displayed contents. The contents information display section 133 includes display portions each of which displays the channels, broadcasting stations, recording dates and times, time zones, or program titles of the displayed contents.

The types of contents information shown on the screen and required to display the scene retrieval screen 131 may be preset in the UI processing section 21 by the user or set by default. The UI processing section 21 reads basic information on the contents for which the scene retrieval screen 131 is displayed, from the basic table stored in the HDD 8, via the UI data generating section 22. The UI processing section 21 thus generates data to be displayed, as part of displayed information.

Before displaying the scene retrieval screen 131, the UI processing section 21 previously includes information that defines the display form of thumbnail images, such as a set point of sight position, the inclination of the time axis, the transmittance of thumbnail images, the number of a plurality of thumbnail images contiguously arranged, the position of the thumbnail images, and the inclination of the arranged thumbnail images.

The UI processing section 21 generates a scene retrieval screen 131 on the basis of the plurality of thumbnail images received from the UI data generating section 22, display information, and positional information. The scene retrieval screen 131 shows a plurality of still images as viewed at a certain angle to the time axis.

The thumbnail images generated by the UI data generating section 22 are converted into texture images by the UI processing section 21, which then uses the resulting texture images to generate a scene retrieval screen shown in FIG. 15.

The thumbnail image example display section 132 in which the number of thumbnail images displayed as a thumbnail image row is predetermined displays the predetermined number of thumbnail images in a thumbnail image row. In FIG. 15, n (n is an integer) screens $132_1, 132_2, 132_3, \ldots, 132n$ are displayed. If the number of screens is set at 100, then for example, the recording time for contents that are motion pictures is divided into 100. Still images corresponding to the respective resulting points in time are generated and displayed.

The plurality of still images may be generated on the basis of analysis information provided by the above contents analyzing section 25. The still images may be generated, for example, for the respective particular analyzed and recognized highlight scenes.

The thumbnail image example display section 132 has a virtual time axis 134 along which a plurality of thumbnail images are arranged from front to back of the screen. The plurality of thumbnail images are arranged from front to back of the screen in order of time elapse. Specifically, thumbnail images in the front of the screen temporally precede those in the back of the screen.

The user can sequentially move the thumbnail images displayed in the thumbnail image example display section 132 of the scene retrieval screen 131, toward the front of the screen, while retrieving a desired scene from that content.

Specifically, depressing the upper part of the ring key 95b with the screen in FIG. 15 displayed moves the plurality of thumbnail images frontward. The thumbnail image on the foremost surface continuously moves frontward and leftward until it disappears from the screen. Each of the thumbnails in the back moves one position ahead; the image $132_2$ moves to the position of $132_1$, while the image $132_3$ moves to the position of $132_2$. The image following the final image $132_n$ is newly added to the position of the image $132n$. Depressing the upper part of the ring key 95b thus changes the display of the thumbnail images so that the time advances. Continuously depressing the upper part of the ring key 95b continuously moves the plurality of thumbnail images ahead; the plurality of thumbnail images appear to flow. Such a thumbnail image display change is effected by the UI processing section 21.

Even though the plurality of thumbnails appears to flow during movement, at a change in thumbnail image, for example, at a change in scene, the entire image has its colors changed. This enables the user to recognize a change in content.

Similarly, depressing the lower part of the ring key 95b with the screen in FIG. 15 displayed moves each of the plurality of thumbnail images backward. The thumbnail image on the foremost surface moves backward; the image $132_1$ moves to the position of $132_2$. Each thumbnail image moves one position backward; the image preceding the image $132_1$ appears at the position of $132_1$. The image $132_{n-1}$ moves to the position of the rearmost image $132_n$. Depressing the lower part of the ring key 95b thus changes the display of the thumbnail images so that the time goes back.

Depressing the right or left part of the ring key 95b may change the inclination of the time axis 134 in the screen. For example, depressing the left part of the ring key 95b increases the difference in angle between the time axis 134 and a line-of-sight direction or a view direction. This separates the axis along which the images overlap one another, from the axis in the line-of-sight direction. Depressing the right part of the ring key 95b reduces the difference in angle between the time axis 134 and the line-of-sight direction. This allows the axis along which the images overlap one another to approach the line-of-sight direction axis.

The above independent dedicated buttons 95d and 95e may be used to change the inclination of the time axis 134.

Figure 16:
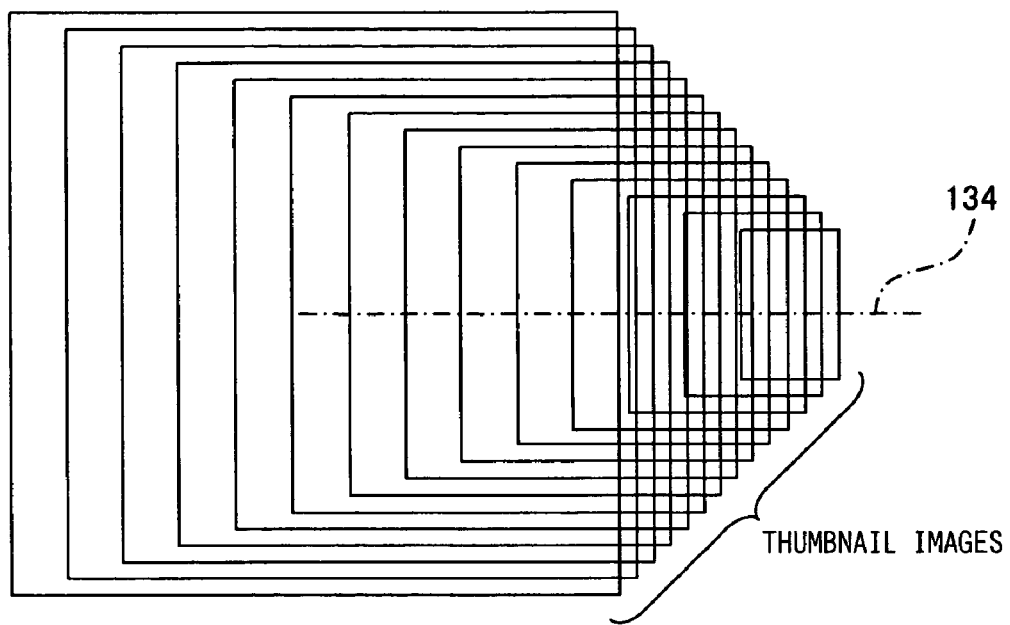
FIG. 16 is a diagram showing an exemplary display illustrating a difference in angle between the time axis and a line-of-sight direction.
Figure 17:
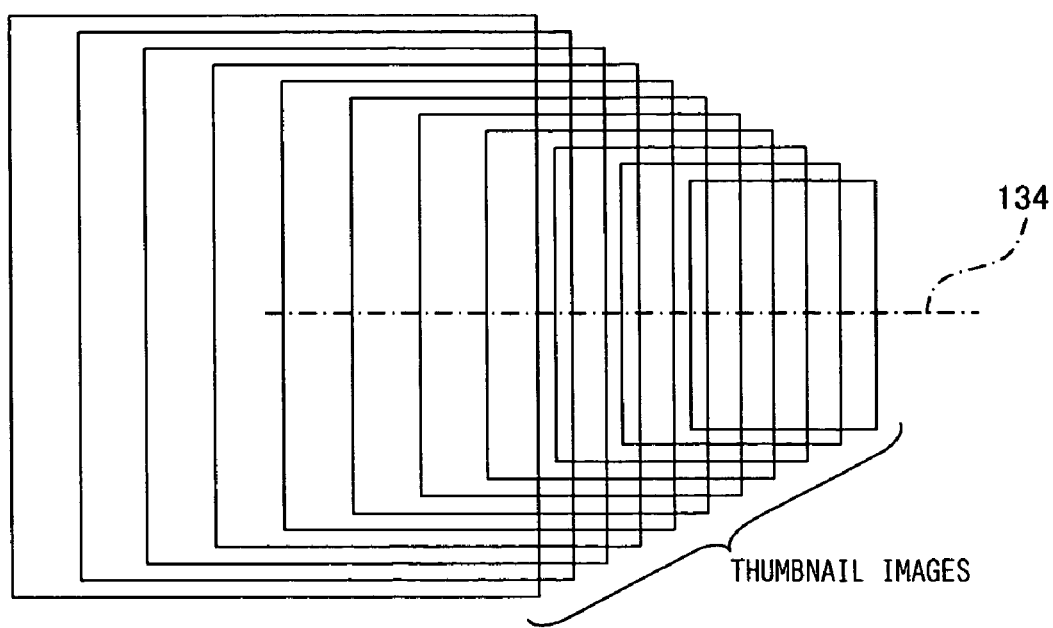
FIG. 17 is a diagram showing an exemplary display illustrating the difference in angle between the time axis and the line-of-sight direction.
Figure 18:
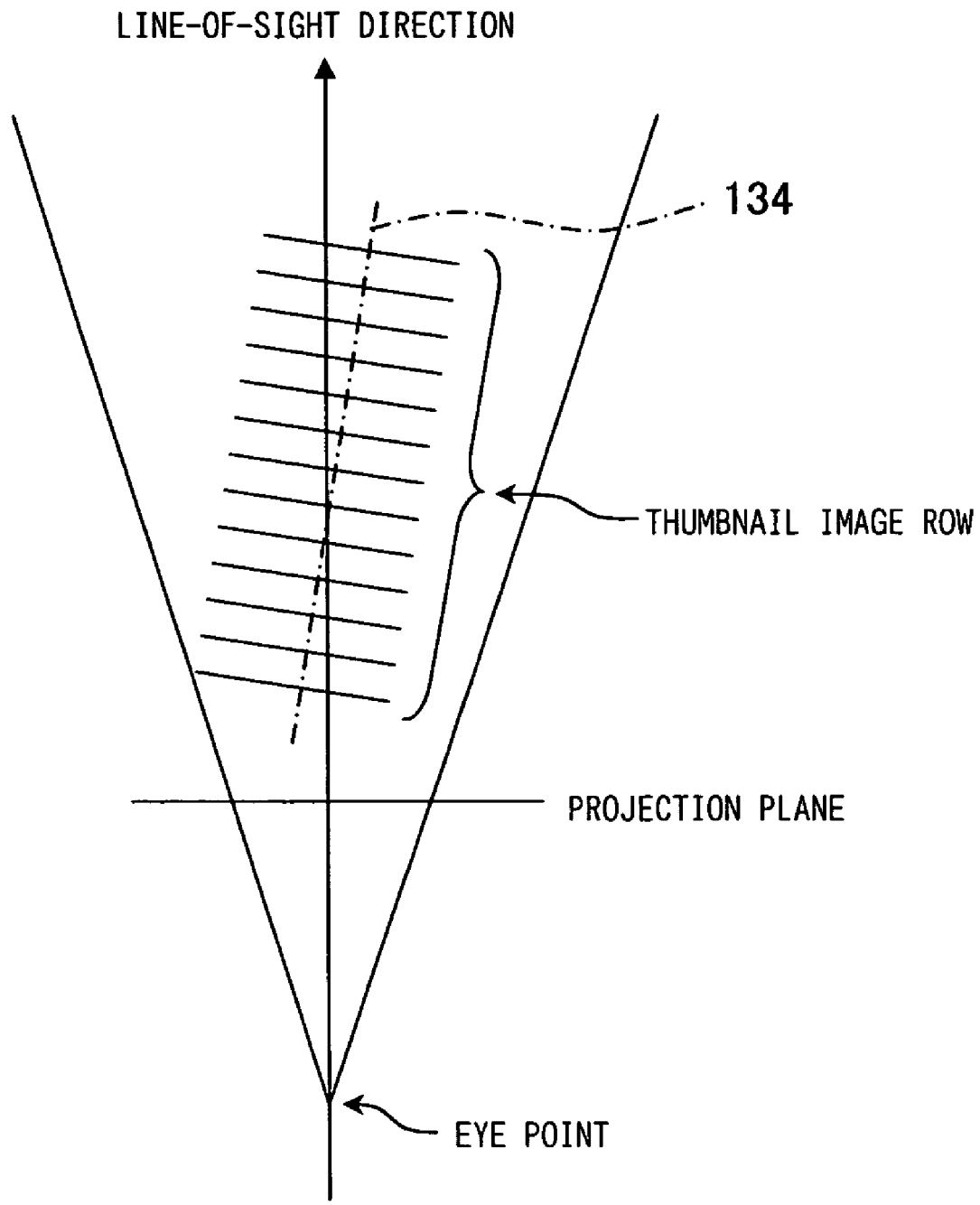
FIG. 18 is a diagram illustrating an axis along which images overlap one another and an axis in the line-of-sight direction.
Figure 19:
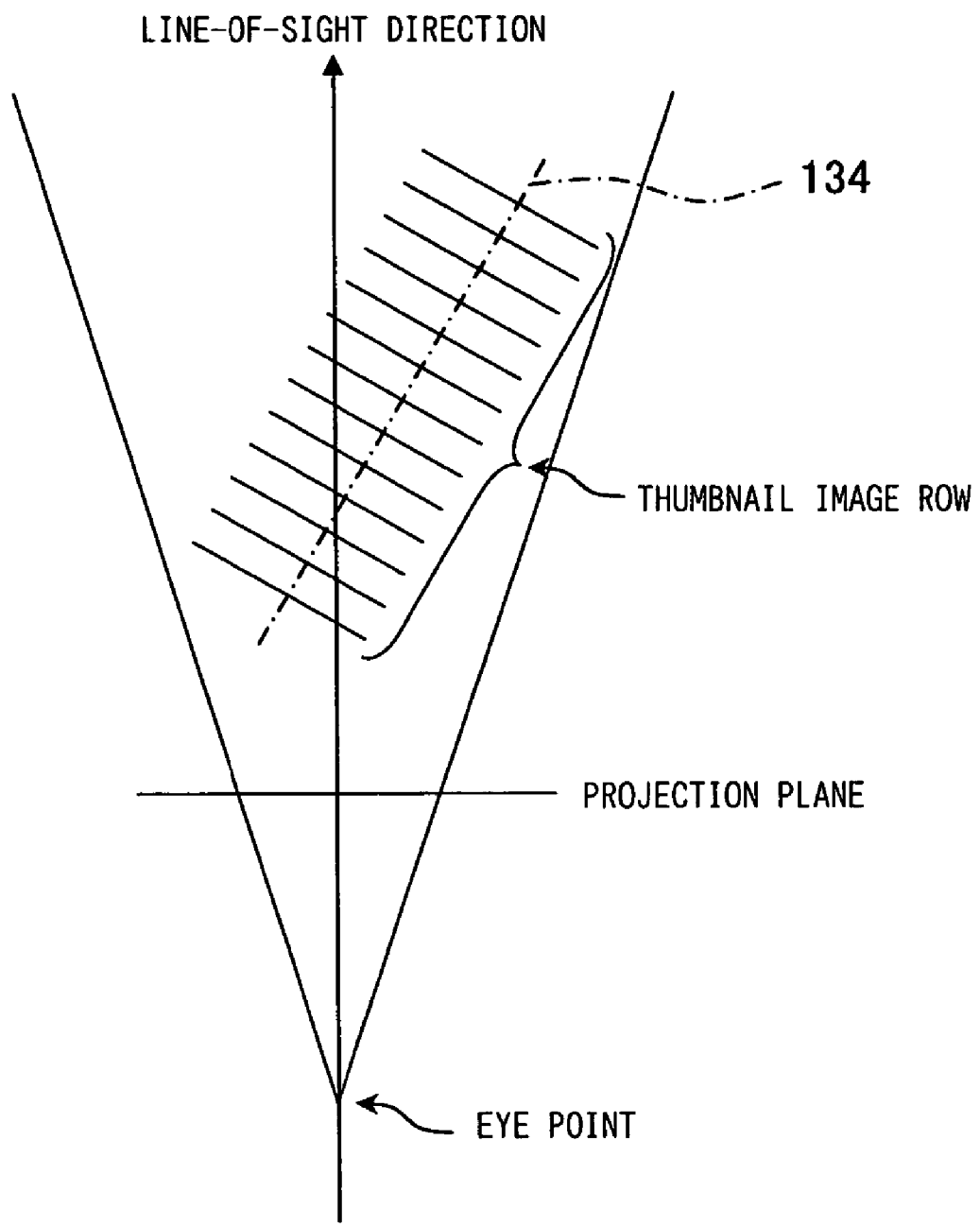
FIG. 19 is a diagram illustrating the axis along which images overlap one another and the axis in the line-of-sight direction.

FIGS. 16 and 17 are diagrams showing exemplary displays illustrating the difference in angle between the time axis 134 and the line-of-sight direction. FIGS. 18 and 19 are diagrams illustrating the axis along which images overlap one another and the line-of-sight direction axis. FIG. 16 shows an exemplary display in which the difference in angle between the time axis 134 and the line-of-sight direction is smaller than that in FIG. 17. In FIG. 18, the axis along which the images overlap one another is closer to the line-of-sight direction axis than in FIG. 19.

The exemplary display in FIG. 16 shows a small angle between the axis along which the images overlap one another and the line-of-sight direction axis as shown in FIG. 18. This enables a row of more thumbnail images to be displayed on a projection plane within a limited lateral range. In contrast, the exemplary display in FIG. 17 shows a large angle between the axis along which the images overlap one another and the line-of-sight direction axis as shown in FIG. 19. This precludes a row of many thumbnail images from being displayed on the projection plane within the limited lateral range.

On the other hand, the exemplary display in FIG. 17 enables the images to be easily seen sequentially from left to right of the screen. However, the exemplary display in FIG. 16 precludes the images from being easily seen.

Accordingly, the exemplary display in FIG. 16 is suitable for, for example, finding a significant scene change such as an inserted CF (Commercial Film) image or for navigating the contents over a long time. The exemplary display in FIG. 17 is suitable for, for example, searching for smaller scenes.

Changing the inclination of the time axis 134 in the screen thus enables the display form to be changed as desired.

Figure 20:
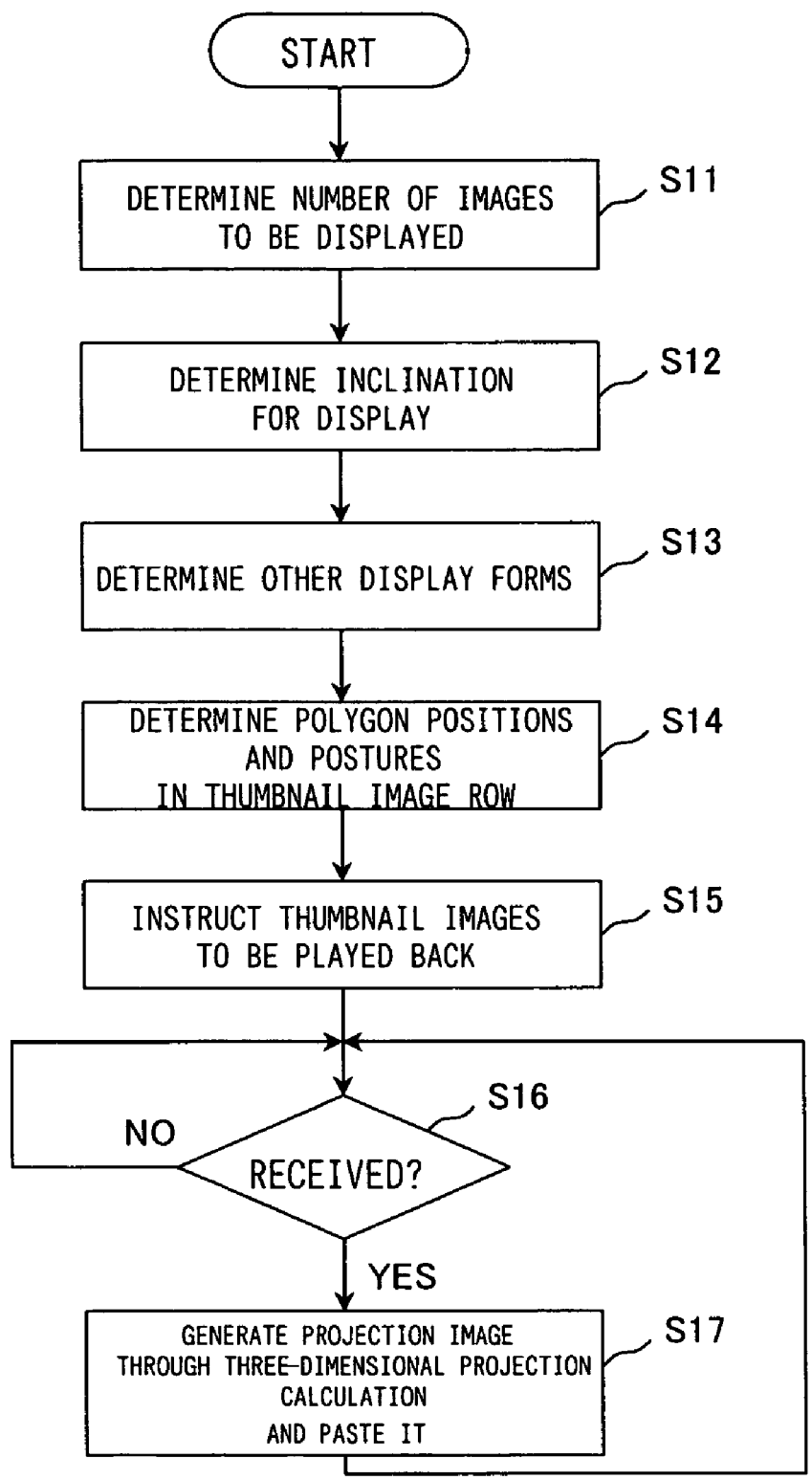
FIG. 20 is a flowchart showing the exemplary flow of a process of generating a scene retrieval screen according to the embodiment of the present invention.

Now, a specific description will be given of a process which generates a scene retrieval screen. FIG. 20 is a flowchart showing the exemplary flow of a process which generates a scene retrieval screen.

First, for any content selected via the cursor 114 in FIG. 12 or via the cursor 126 in FIG. 13, a command for display of the scene retrieval screen is input to the UI processing section 21. The UI processing section 21 reads preset information on the number of a plurality of thumbnail images to be displayed, to determine the number of images to be displayed (step S11).

The UI processing section 21 subsequently reads preset information on the inclination of the plurality of thumbnail images to be displayed, to determine the inclination of the image row to be displayed (step S12).

The UI processing section 21 further reads preset information on the inclination of the time axis, the transmittance of the thumbnail images, and the like, to determine the display form of the plurality of thumbnail images (step S13).

The UI processing section 21 then determines the display positions and postures of polygons in the thumbnail image row (step S14). This determines the positions and postures for the display of the thumbnail images received from the UI data generating section 22.

Although not shown, the UI processing section 21 simultaneously acquires information on the selected content from the basic table in the data storing and extracting section 24 via the UI data generating section 22. The UI processing section 21 then acquires information to be displayed in the contents information display section 133, from the basic table information acquired.

The UI processing section 21 then instructs the UI data generating section 22 to generate a thumbnail image row on the basis of video information on the content (step S15). The instruction contains information on the number of thumbnail images to be generated and the time to start generation of thumbnail images.

The UI processing section 21 determines whether or not a thumbnail image has been received from the UI data generating section 22, which has instructed a thumbnail image row to be generated (step S16). If a thumbnail image has been received, the determination in step S16 is YES and each thumbnail image generated is transmitted to the UI processing section 21.

Every time the UI processing section 21 receives a thumbnail image, it generates a texture image. The UI processing section 21 then executes a three-dimensional projection calculation on the texture image generated to generate a projection image. The UI processing section 21 further pastes the projection image at a predetermined position in the thumbnail image example display section 132 in FIG. 14 (step S16).

As described above, the process shown in FIG. 20 constitutes a still image display section that three-dimensionally displays a predetermined number of still images generated along a predetermined axis on the screen.

The process subsequently returns to step S16 to repeat the subsequent operations.

Figure 21:
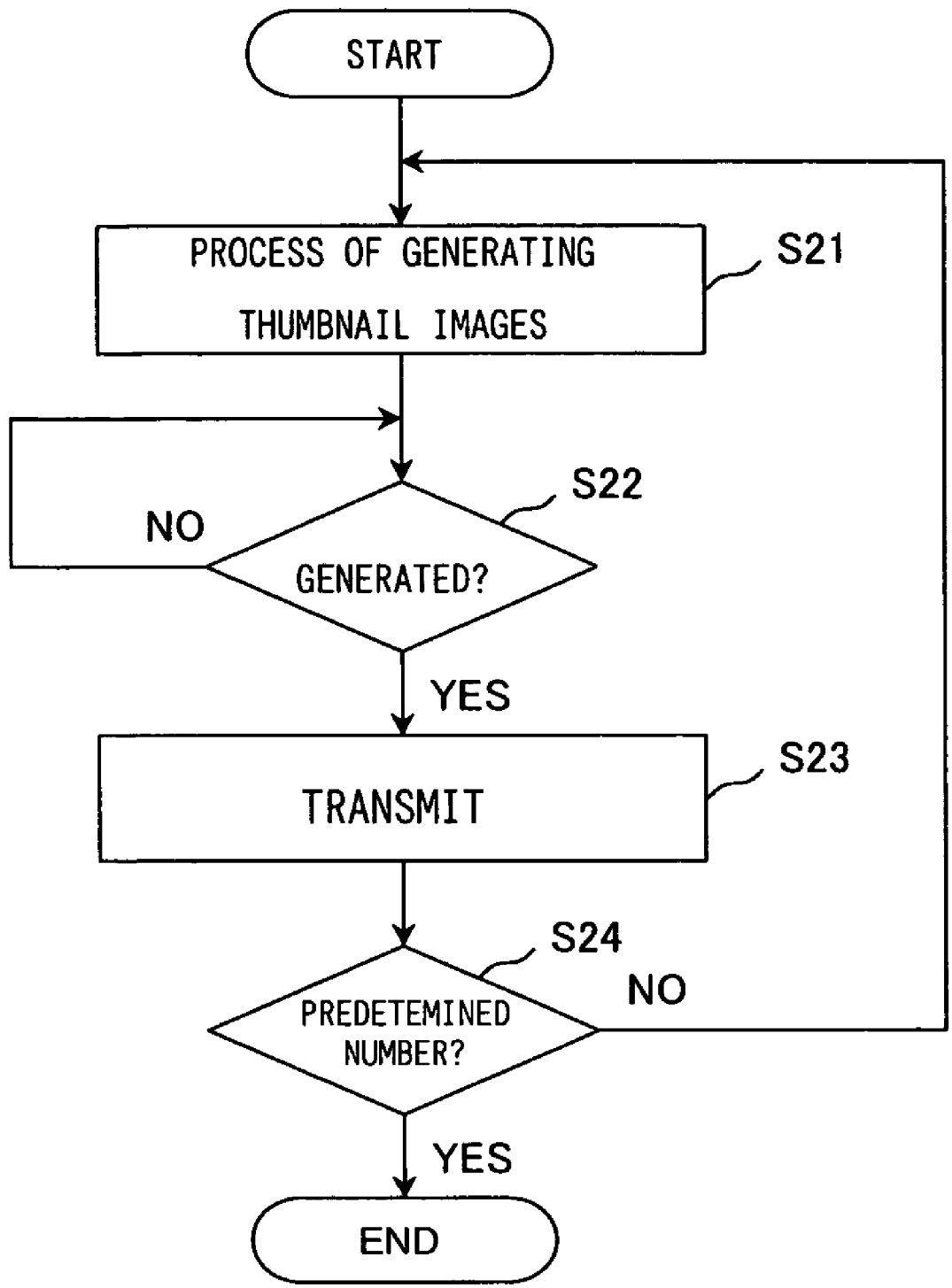
FIG. 21 is a flowchart showing the exemplary flow of a process of generating a thumbnail image row according to the embodiment of the present invention.

FIG. 21 is a flowchart showing the exemplary flow of a process which generates a thumbnail image row in the UI data generating section 22.

The UI data generating section 22 receives a command for generation of thumbnail images corresponding to step S15, from the UI processing section 21. The UI data generating section 22 executes a process which generates a thumbnail image according to the time elapse from a predetermined time, for example, a contents recording start time (step S21). The UI data generating section 22 determines whether or not one thumbnail image has been generated, that is, one thumbnail image has been completed (step S22). If one thumbnail image has not been completed, the determination in step S22 is NO and no operations are performed.

When one thumbnail image is completed, the determination in step S22 is YES and the completed image is transmitted to the UI processing section 21 (step S23). The UI data generating section 22 then determines whether or not a specified number of thumbnail images have been generated (step S24). If a specified number of thumbnail images have not been generated, the determination in step S24 is NO and the process returns to step S21 to repeat the subsequent operations. If a specified number of thumbnail images have been generated, the determination in step S24 is YES and the process is ended. As described above, steps S21 and S22 constitute a still image generating section that generates a predetermined number of still images from video information, along the time elapse from a predetermined time. Steps S22 and S23 constitute a still image information sequential-transmission section that sequentially transmits still image information to the UI processing section 21 every time a still image is generated.

The predetermined time varies while the upper or lower part of the ring key 95*b* remains depressed. A thumbnail image row is generated in association with the varying predetermined time. Specifically, in response to commands generated and transmitted by depressing the upper or lower part of the ring key 95*b*, the predetermined time is varied to add ungenerated still images to generate a predetermined number of still images.

Generation of a thumbnail image row allows required information to be recorded in the extension table 41 in FIG. 5 and in the thumbnail image row information table 71 in FIG. 8. The extension tables 41 and the thumbnail image row information table 71 are used to read information on a thumbnail image row generated.

The UI data generating section 22 thus executes, in parallel, a process which generates thumbnail images and a process which transmits thumbnails generated. Accordingly, the UI processing section 21 sequentially receives the thumbnail images generated. The UI processing section 21 sequentially converts the received thumbnail images into texture images and pastes the texture images at predetermined positions in the thumbnail image example display section 132 in FIG. 14. Thus, when the user operates the remote controller 11 to instruct the scene retrieval screen 131 to be displayed, the thumbnail images are sequentially displayed in the scene retrieval screen 131 in FIG. 14 from front to back of the screen. Specifically, in FIG. 14, the images are displayed in order of 132$_1$, 132$_2$, 132$_3$, . . . .

As described above, if the user retrieves scenes contained in a content, the scene retrieval screen 131 in FIG. 15 three-dimensionally displays the leading still images of the videos of predetermined units into which the content is divided so that the images overlap one another in the depth direction. This allows the user to intuitively and easily see the picture of that content, thus facilitating scene retrieval. In other words, the user views a plurality of images in the same manner that the user is turning over a plurality of pages, so that a desired scene can be retrieved from the change of the image.

In the above description, the scene retrieval screen in FIG. 15 is generated for the selected content. However, a channel may be selected so that the scene retrieval screen in FIG. 15 is generated for contents consecutively recorded through that channel.

Moreover, in the above description, the ring key on the remote controller 11 is used to give instructions on the depth direction. However, another input equipment, for example, a joy stick may be used to give instructions on the depth direction.

As described above, the present embodiment can provide a video contents display system which allows the user to easily see and intuitively understand recorded video contents and to easily perform an operation of retrieving video contents.

A program performing the above operations is partly or entirely recorded or stored in portable media such as a floppy disk or a CD-ROM, a storage device such as a hard disk, or the like. The program is read by a computer to perform all or some of the operations. Alternatively, the program can be entirely or partly distributed or provided via a communication network. The user can easily implement the video contents display system of the present invention by downloading the program via a communication network and installing it in the computer or by installing the program from recording media in the computer.

The present invention is not limited to the above embodiments. Many changes, modifications, or the like may be made to the embodiments without departing from the spirit of the present invention.

What is claimed is:

1. A video contents display system for use with a video content recording system, comprising:
a contents information display section that allows pieces of contents information on a plurality of recorded video contents to be displayed along a time axis on a screen for each of a plurality of broadcasting or distribution channels, wherein the pieces of contents information are arranged along the time axis according to elapsed time in a first two-dimensional plane in a display form such that the pieces of contents information are viewed from a predetermined point of sight direction in a three dimensional space;
an operation unit interface section that receives an operation signal of at least one of the functions of playback, reverse playback, fast-forward playback, fast-forward reverse playback and playback pause of each of the plurality of video contents; and
a video contents display section that allows each of the plurality of video contents for each of the plurality of broadcasting or distribution channels which correspond to a specified time to be displayed as a thumbnail of a motion picture at a location corresponding to the specified time on the time axis, where the plurality of video contents are aligned along a line corresponding to the specified time, and are displayed simultaneously on a second two-dimensional plane orthogonal to the first two-dimensional plane, and wherein the video contents display section allows the specified time to be changed based on the operation signal received by the operation unit interface section, and allows each of the plurality of video contents which correspond to the changed specified time to be displayed at the location as the thumbnail of the motion picture of each of the video contents, wherein the location is updated to corresponds to the changed specified time on the time axis and the thumbnails represent contents broadcasted or distributed at the same time.

2. The video contents display system according to claim 1, wherein the contents information display section displays three or more pieces of contents information for each of the broadcasting and distribution channels.

3. The video contents display system according to claim 2, wherein the contents information display section acquires electronic program guide information on the basis of information on the specified time, acquires information on motion picture thumbnails relating to the electronic program guide information, synthesizes the electronic program guide information and the information on the motion picture thumbnails, and displays the pieces of contents information in the display form.

4. The video contents display system according to claim 3, wherein the time axis has a direction in which time goes back from front to back of the screen when a user views the screen, and
the contents information at a time later than the specified time on the time axis is based on a broadcasting or distribution schedule.

5. The video contents display system according to claim 1, further comprising a genre selection screen generating section which generates a genre selection screen that allows genres to be selected for the plurality of video contents, and the genre selection screen displays the plurality of video contents for each of the genres as a three-dimensional set as viewed from one point of sight.

6. The video contents display system according to claim 5, further comprising a contents retrieval screen generating section that generates a contents retrieval screen that allows retrieval of one of the plurality of video contents belonging to the genre selected in the genre selection screen, the one being to be viewed, and wherein the contents retrieving section three-dimensionally displays the video contents, and the video content at a predetermined position on the screen is displayed as motion picture thumbnails.

7. The video contents display system according to claim 1, wherein the specified time is a current time that varies with time elapse.

8. The video contents display system according to claim 7, wherein the contents information display section acquires electronic program guide information on the basis of information on the specified time, acquires information on motion picture thumbnails relating to the electronic program guide information, synthesizes the electronic program guide information and the information on the motion picture thumbnails, and displays the pieces of contents information in the display form.

9. The video contents display system according to claim 8, wherein the time axis has a direction in which time goes back from front to back of the screen when the user views the screen, and
the contents information at a time later than the specified time on the time axis is based on a broadcasting or distribution schedule.

10. The video contents display system according to claim 1, wherein the video contents display section displays each of the plurality of video contents at a location corresponding to a location where each of the corresponding contents information are displayed on the first two-dimensional plan.

11. The video contents display system according to claim 1, wherein the operation unit interface section is adapted to be able to receive all of the operation signals corresponding to the functions of playback, reverse playback, fast-forward playback, fast-forward reverse playback and playback pause.

12. A video contents display method for use with a video content recording system, comprising:
displaying pieces of contents information on a plurality of recorded video contents along a time axis on a screen for each of a plurality of broadcasting or distribution channels, wherein the pieces of contents information are arranged along the time axis according to elapsed time in a first two-dimensional plane in a display form such that the pieces of contents information are viewed from a predetermined point of sight direction in a three dimensional space; and
displaying each of the plurality of video contents for each of the plurality of broadcasting or distribution channels which correspond to a specified time as a thumbnail of a motion picture at a location corresponding to the specified time on the time axis, where the plurality of video contents are aligned along a line corresponding to the specified time, are displayed simultaneously and on a second two-dimensional plane orthogonal to the first two-dimensional plane, and changing the specified time based on an operation signal of at least one of the functions of playback, reverse playback, fast-forward playback, fast-forward reverse playback and playback pause received by an operation unit interface section, and displaying each of the plurality of video contents which correspond to the changed specified time at the location as the thumbnail of the motion picture of each of the video contents, wherein the location is updated to corresponds to the changed specified time on the time axis and the thumbnails represent contents broadcasted or distributed at the same time.

13. The video contents display method according to claim 12, wherein each of the plurality of video contents are displayed at a location corresponding to a location where each of the corresponding contents information are displayed on the first two-dimensional plan.

14. The video contents display method according to claim 12, wherein the operation unit interface section is adapted to be able to receive all of the operation signals corresponding to the functions of playback, reverse playback, fast-forward playback, fast-forward reverse playback and playback pause.

15. A non-transitory computer readable medium storing a computer executable program for use with a video content recording system, the program allowing a, computer to execute:

a function that displays pieces of contents information on a plurality of recorded video contents along a time axis on a screen for each of a plurality of broadcasting or distribution channel wherein the pieces of contents information are arranged along the time axis according to elapsed time in a first two-dimensional plane in a display form such that the pieces of contents information are viewed from a predetermined point of sight direction in a three dimensional space; and a function that displays each of the plurality of video contents for each of the plurality of broadcasting or distribution channels which correspond to a specified time as a thumbnail of a motion picture at a location corresponding to the specified time on the time axis, where the plurality of video contents are aligned along a line corresponding to the specified time, are displayed simultaneously and on a second two-dimensional plane orthogonal to the first two-dimensional plane, and the function changes the specified time based on an operation signal of at least one of the functions of playback, reverse playback, fast-forward playback, fast-forward reverse playback and playback pause received by an operation unit interface section, and displays each of the plurality of video contents which correspond to the changed specified time at the location as the thumbnail of the motion picture of each of the video contents, wherein the location is updated to corresponds to the changed specified time on the time axis and the thumbnails represent contents broadcasted or distributed at the same time.

16. The computer-readable medium according to claim 15, wherein each of the plurality of video contents are displayed at a location corresponding to a location where each of the corresponding contents information are displayed on the first two-dimensional plan.

17. The computer-readable medium according to claim 15, wherein the operation unit interface section is adapted to be able to receive all of the operation signals corresponding to the functions of playback, reverse playback, fast-forward playback, fast-forward reverse playback and playback pause.

* * * * *